United States Patent

[11] 3,564,133

| | | |
|---|---|---|
| [72] | Inventor | Gilbert L. Hobrough<br>Woburn, Mass. |
| [21] | Appl. No. | 609,662 |
| [22] | Filed | Jan. 16, 1967 |
| [45] | Patented | Feb. 16, 1971 |
| [73] | Assignee | Itek Corporation<br>Lexington, Mass.<br>Continuation-in-part of application Ser. No.<br>394502, Sept. 4, 1964, now Patent No.<br>3,422,674. This application Jan. 16, 1967,<br>Ser. No. 609,662 |

[54] TRANSFORMATION AND REGISTRATION OF PHOTOGRAPHIC IMAGES
13 Claims, 21 Drawing Figs.

[52] U.S. Cl. .................................................. 178/6.8;
250/220; 356/2, 356/167
[51] Int. Cl. ...................................................... H04n 7/18
[50] Field of Search............................................ 356/156,
157, 158, 163, 167, 168, 2; 178/6.8; 250/217
(CRT), 220 (SP)

[56] References Cited
UNITED STATES PATENTS

| | | | |
|---|---|---|---|
| 3,004,464 | 10/1961 | Leighton...................... | 178/6.8 |
| 3,145,303 | 8/1964 | Hobrough.................... | 250/220SP |
| 3,234,845 | 2/1966 | Stavis........................... | 356/167 |
| 3,267,286 | 8/1966 | Bailey........................... | 250/220SP |

Primary Examiner—Richard Murray
Assistant Examiner—Joseph A. Orsino, Jr.
Attorneys—Stanley Bialos, Homer O. Blair and Robert L. Nathans ABSTRACT: A method of and apparatus for developing from a stereographic pair of photographic images difficult of registration one with the other for optical inspection of homologous areas because of relative distortions therebetween, area-by-area reproductions of such photographic images suitably registered for optical inspection as a result of relative distortions being corrected. Involved in the system are scanning the photographic images area-by-area with a pair of flying spot scanners, collecting the image-modulated light produced by such scanning with a pair of photoelectric detectors, comparing the output signals from the photoelectric detectors in an electronic correlator and developing parallax error signals representative of relative distortions between the homologous areas being scanned, and providing at a binocular viewer optical reproductions of such areas correctively altered by an electronic transformation unit to relieve relative distortions and thereby provide optical images in registration for inspection. The relative distortions between photographic images are classifiable into zero-, first-, second-, and higher-orders of distortion, and of primary concern herein is the correction of second- and higher-order distortions by means of reverberatory integration techniques.

FIG-1

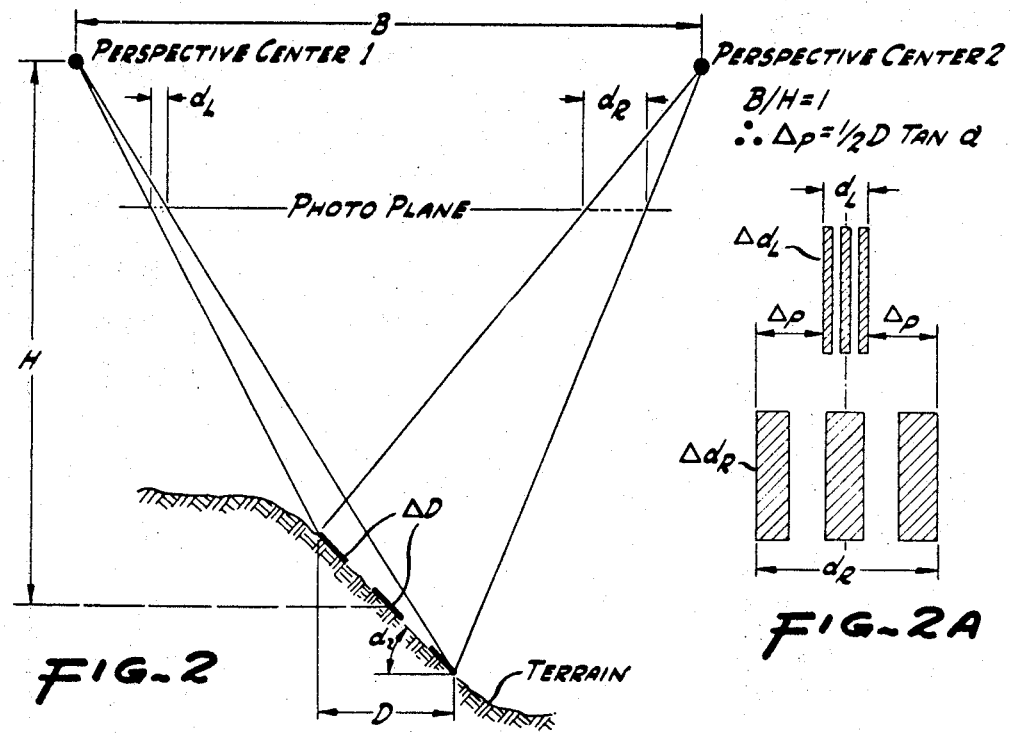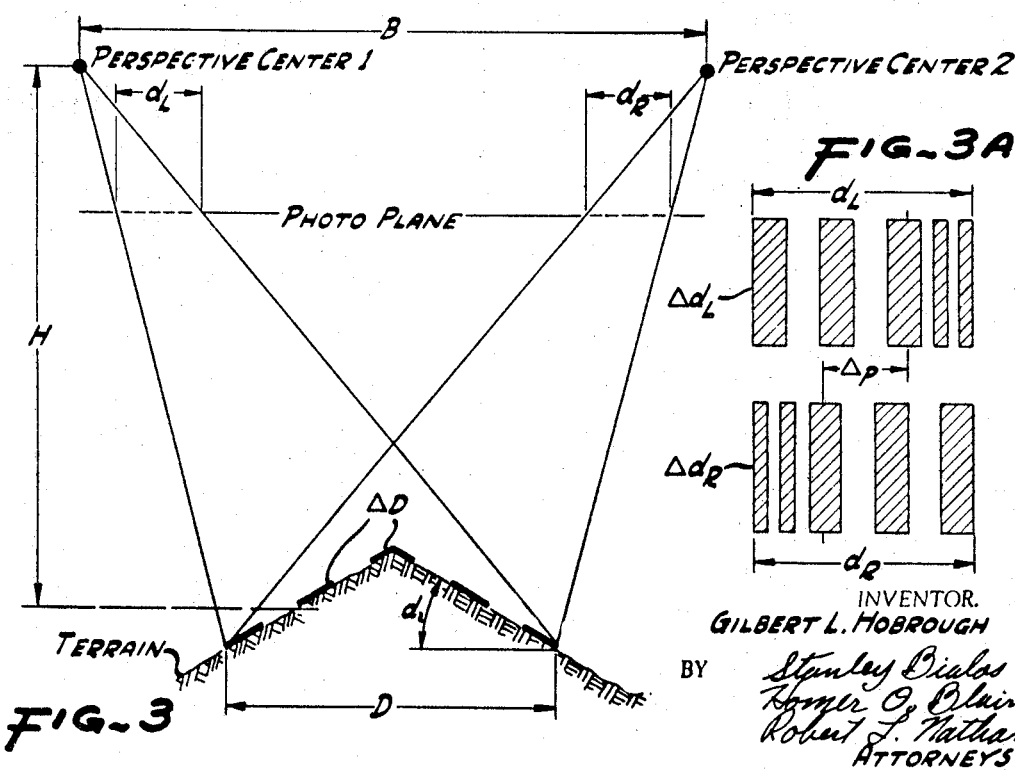

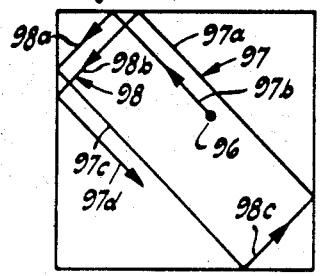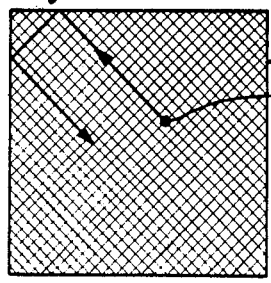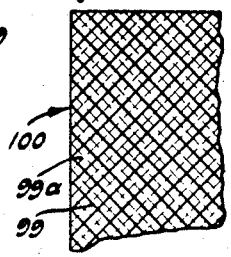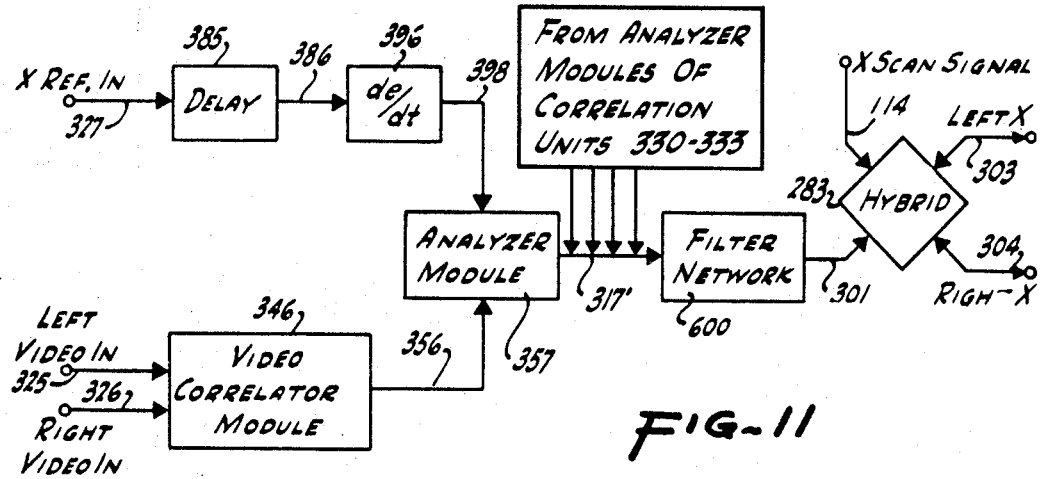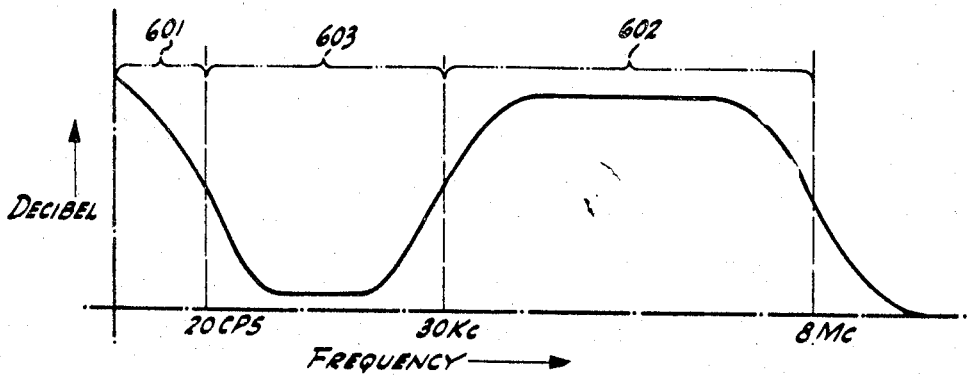

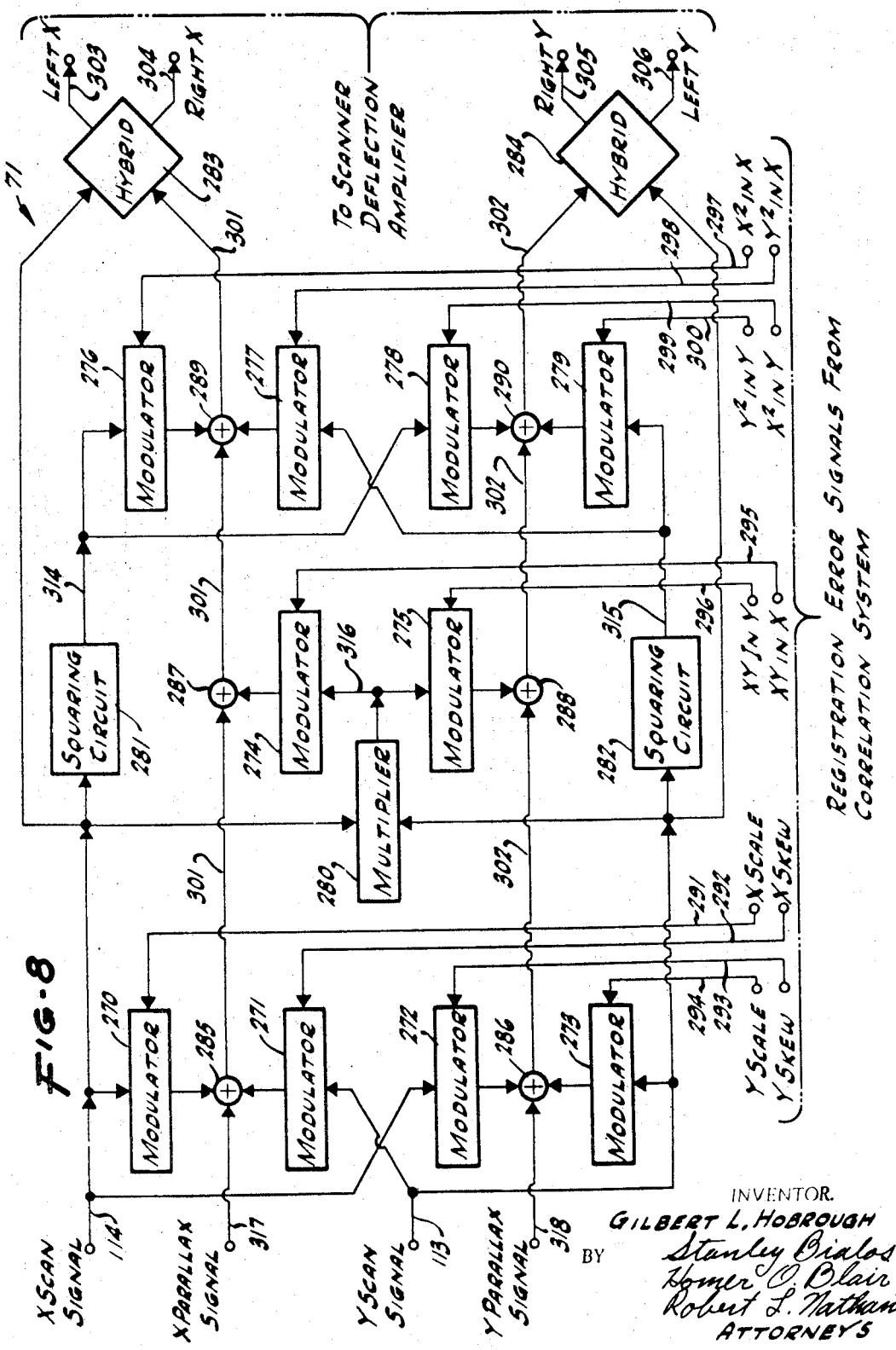

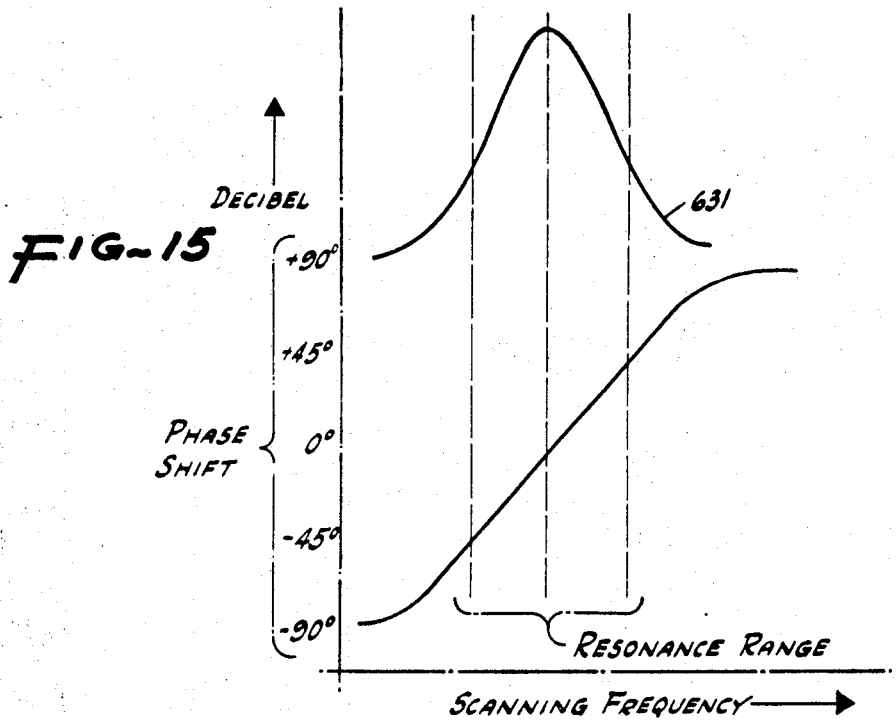
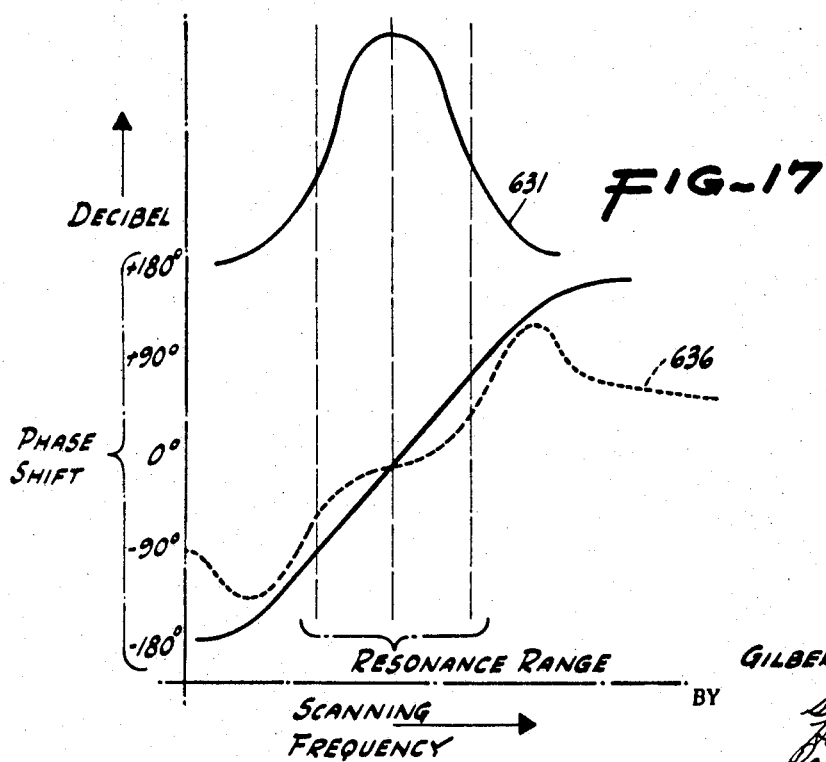

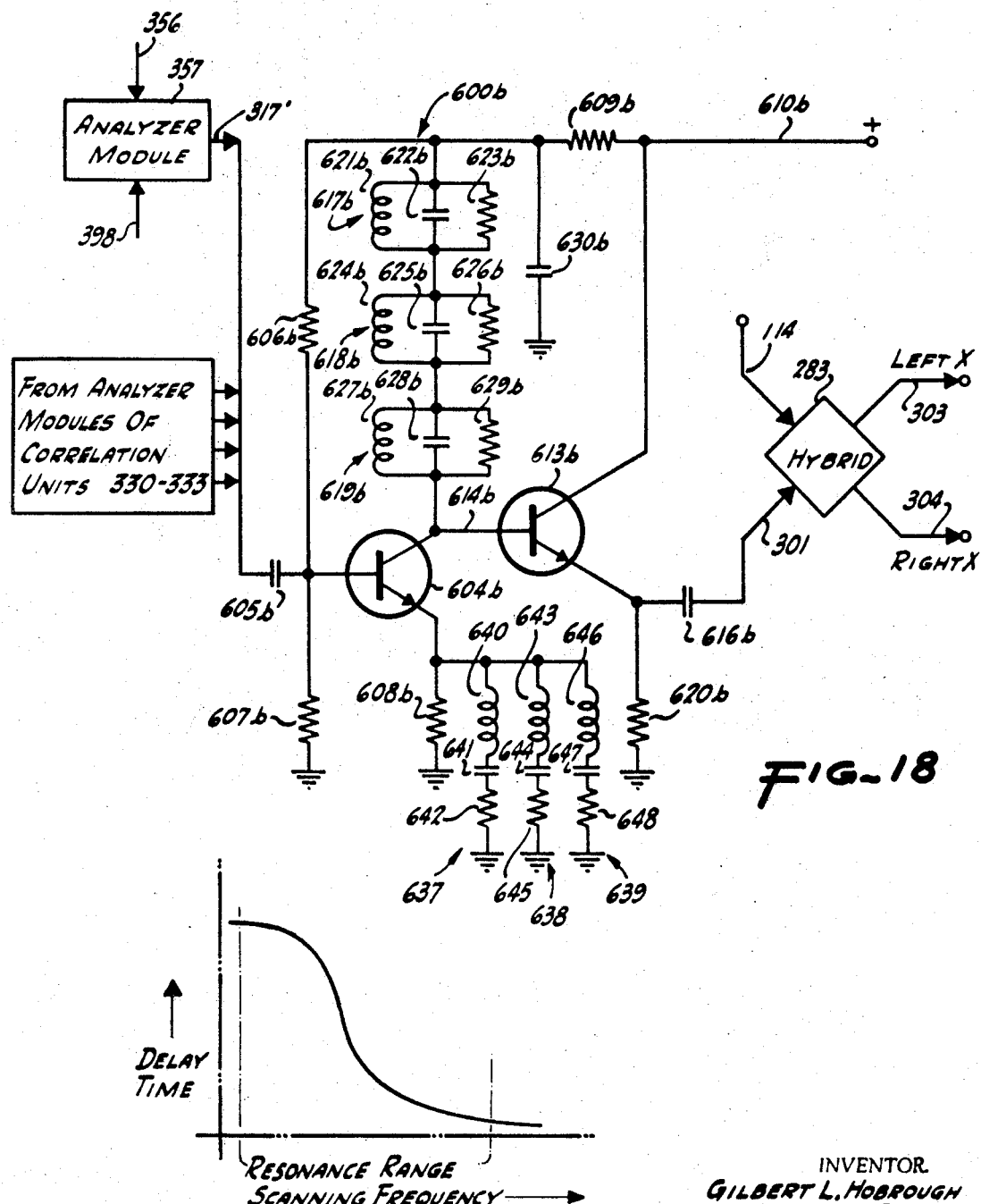

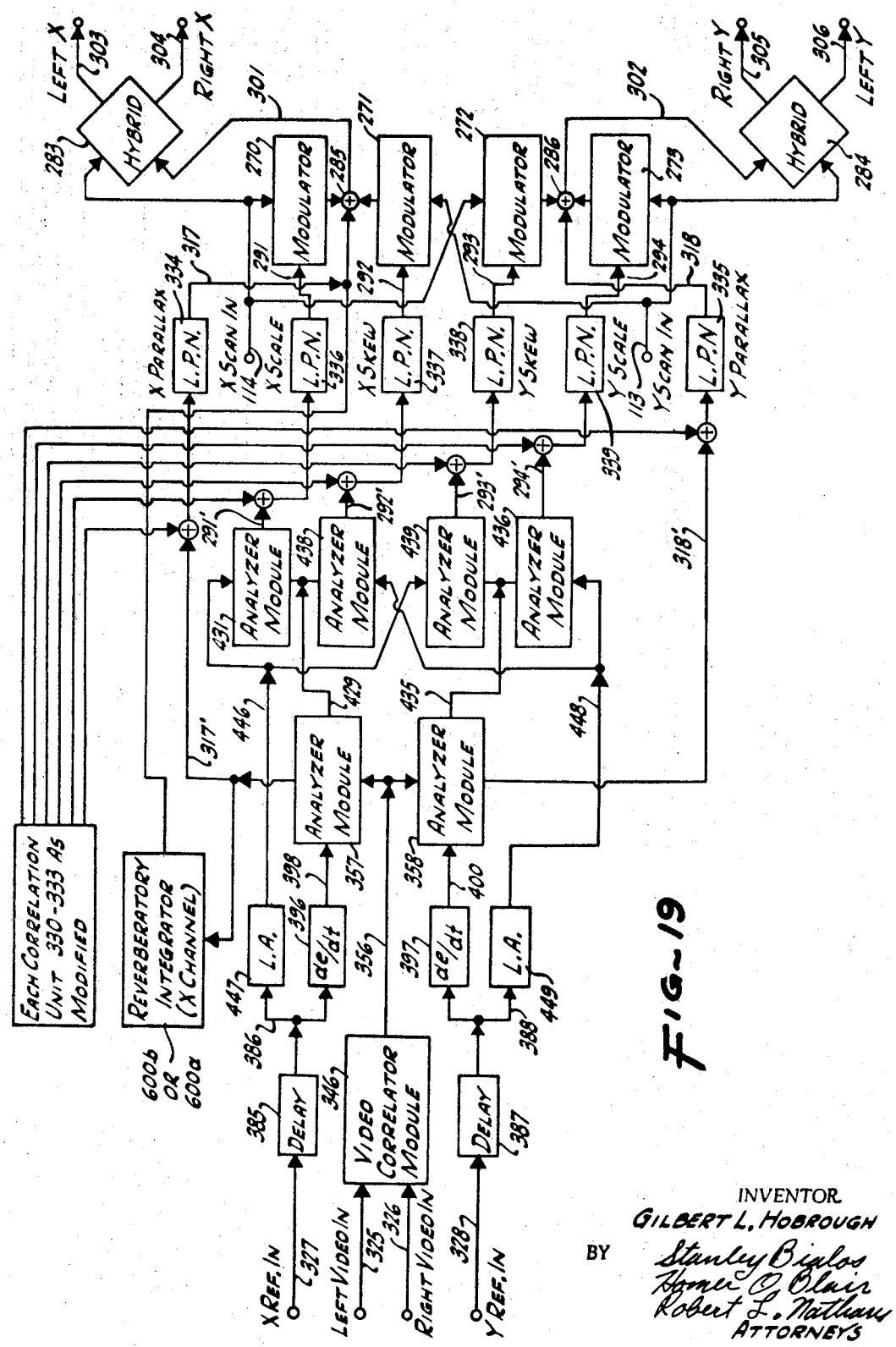

TRANSFORMATION AND REGISTRATION OF PHOTOGRAPHIC IMAGES

This application is a continuation-in-part of my copending U.S. Pat. application, Ser. No. 394,502, now U.S. Pat. No. 3,422,674, Sept. 4, 1964.

As in the case of the invention disclosed in such copending patent application, the present invention pertains to the art of photogrammetry and is concerned primarily with the registration of similar stereo photographic images either for stereoscopic inspection thereof or for deriving terrain measurements therefrom, especially height and distance dimensions. In particular, the invention relates to a viewing instrument or stereoscope in which image transformations (especially second- and higher-order transformations) requisite to such registration are performed automatically.

As explained in the aforementioned copending patent application, the presence of relative distortions between a stereo pair of photographic images is a common occurrence quite familiar to photogrammetists. As a consequence of such relative image distortions, effecting registration of a pair of photographic images generally requires one or more distortion-correcting or-compensating image transformations to be made on either or both of such images. As a matter of convenience herein and to explain what is meant by the aforementioned terms "transformation" and "registration," as well as certain other terms used hereinafter, the following definitions are included:

1. transformation—a systematic operation upon an image thereby to alter its scale, orientation, or overall shape;
2. parallax—the separation, generally unwanted, between corresponding points in similar images when superimposed;
3. registration—the act of transforming one or both of a pair of similar images so as substantially to reduce all parallaxes to zero when the images are superimposed;
4. relative distortion—a difference in size or shape of similar images such that a transformation of one or both images is required to achieve registration;
5. manual registration—the visual observation of parallax and the manual adjustment of the various image transformations as required to reduce the parallaxes to zero;
6. automatic registration—the sensing of image parallaxes (electronically herein) and the automatic feedback adjustment of "prime" transformations toward registration.

In order to explain more conveniently the requirement for image transformations for the purpose of registering similar but nonidentical images so as to locate homologous points therein, a description of the composition of a viewing system for a pair of stereographs will be helpful. A typical system includes a pair of cathode-ray tubes or flying spot scanners, and a raster generator operative in conjunction with such tubes to develop a scanning raster on the face of each. Such rasters are respectively imaged through appropriate objective lens onto the image-containing emulsions of a pair of stereographs; and as the electron beam generated within each tube traces the scanning raster on the face thereof, the resulting light spots from the tubes synchronously scan the photographic images. The images modulate the scanning light that reaches a pair of photoelectric detectors or pickup devices, such as multiplier phototubes, which respond to the light indicant thereon and produce output video signals that fluctuate in accordance with such light modulation.

If identical images are being scanned and if they are identically positioned with respect to their associated optical axes, then identical video signals will be delivered by the two photocells. On the other hand, if the images are not identical and differ in some respect, or if they are not identically positioned, the video signals will differ and homologous points practicably cannot be located in such images unless one or the other, or both, are actually or apparently transformed to resolve any such differences or position disparities therebetween. To facilitate analysis of the character of the transformations requisite to effect registration of any such pair of images, a classification system will be of considerable value; and for convenience, the classification system set forth in the aforementioned copending patent application is repeated herein and is as follows:

A group consisting of 10 first- and second-order transformations are taken to be prime, and there are various combinations of such prime transformations which are advantageously considered therewith. In this system of classification, relative displacement or separation between undistorted images—i.e., parallax—is regarded as a zero-order transformation. The 10 first- and second-order transformations are illustrated in FIG. 1 of the drawings in superimposed relation, in each instance, on a nontransformed image indicated by broken lines. Referring to this FIG., it is seen that the first-order transformations are grouped in the left-hand vertical column and that the second-order transformations are grouped in the right-hand vertical column. The 10 prime transformations comprise two groups of vie each, respectively involving $x$ parallaxes and $y$ parallaxes. In FIG. 1, the five prime transformations involving $x$ parallaxes are located in the upper horizontal row, and the five prime transformations involving $y$ parallaxes are located in the middle horizontal row. In the lower horizontal row are illustrated five combinations of the prime transformations, and as is evident in FIG. 1, three of such combinations are of the first-order and two are of the second-order.

Referring to the illustrated transformations, the $x$ in $x$ (or $x$ scale) transformation constitutes either an elongation (as shown) or shortening of the image along the $x$ or horizontal axis so that the image, which initially is square-shaped, becomes rectangular. Similarly, the $y$ in $y$ (or $y$ scale) transformation is either an elongation (as shown) or shortening of the image along the $y$ or vertical axis. A combination of the $x$ scale and $y$ scale transformations gives the scale transformation, illustrated under first-order combinations, in which the image is elongated or shortened both in the $x$ and $y$ directions to enlarge (as shown) or reduce the same from the initial dimensions thereof illustrated by broken lines.

The $y$ in $x$ (or $x$ skew) transformation is an angular distortion in which the image becomes a parallelogram with the base thereof parallel to the $x$ or horizontal axis. The $x$ in $y$ (or $y$ skew) transformation is an angular distortion in which the image becomes a parallelogram with the base thereof parallel to the $x$ or horizontal axis. The $x$ in $y$ (or $y$ skew) transformation is an angular distortion in which the image becomes a parallelogram with the base thereof parallel to the $y$ or vertical axis. Combinations of the $x$ skew and $y$ skew transformations yield the rotation transformations indicated under first-order combinations.

The second-order transformations include an $x^2$ in $x$ transformation in which the image is enlarged to progressively increasing degrees along the $x$ axis, and the $y^2$ in $y$ transformation is a similar enlargement along the $y$ axis. The $y^2$ in $x$ transformation results in a parabolic curving of all of the $y$ ordinates. Similarly, the $x^2$ in $y$ transformation results in a parabolic curving of all of the $x$ abscissas. The $xy$ in $x$ transformation is a linear change in the $x$-direction-width of the image which change progresses along the $y$ axis. Correspondingly, the $xy$ in $y$ transformation is a linear change in the $y$-direction-width of the image which change progresses along the $x$ axis. Combinations of the prime second-order transformations to produce the two illustrated projective combinations are, respectively, the $y^2$ in $y$ and $xy$ in $x$ transformations, and the $x^2$ in $x$ and $xy$ in $y$ transformations.

Each of the FIG. 1 illustrations representing prime transformations shows the effect of such transformations upon an undistorted image consisting of a square 4×4 grid. Considering firstly $x$ scale transformations, such a transformation can be produced by adding to the $x$ coordinate of any point in the undistorted image area a quantity proportional to such $x$ coordinate. Similarly, a $y$ scale transformation can be produced by adding to the $y$ coordinate of any point in the undistorted image area a quantity proportional to such $y$ coordinate.

$X$ skew transformations can be produced by adding to the $x$ coordinate of any point in the undistorted image area a quantity proportional to the y coordinate of that point. Similarly, the y skew distortion illustrated in FIG. 1 can be produced by adding to the y coordinate of any point in the undistorted image area a quantity proportional to the x coordinate of that point.

All distortions shown in FIG. 1 can be construed as being produced by additions of this type; for example, the second-order distortions $y^2$ in $x$ can be produced by adding to the $x$ coordinate of any point in the undistorted image area a quantity proportional to the square of the $y$ coordinate of that point.

It may be noted that panoramic photographs taken in their entirety present considerable third and higher order distortions. However, sections of a panoramic photograph of a size likely to be examined at any one time show much less higher order distortion; and, consequently, it usually will be unnecessary to undertake systematic transformations of orders higher than the second when dealing with such photography. Terrain relief also introduces relative distortion of a severe form between pairs of stereo photographs, but although such distortions are randomly variable, may be of very high order and are not subject to systematic transformation, they are confined to image displacements in the x direction since only x parallaxes represent terrain relief.

The introduction of distortion as a consequence of terrain relief is illustrated in FIGS. 2 and 3, each of which shows that relative image distortions in the form of local scale differences are produced whenever the terrain surface is not parallel to the image or photo plane of the survey camera. More particularly, and referring to FIG. 2, the horizontal distance D along the terrain slope (i.e., the projected slope distance) as viewed from the respective perspective centers 1 and 2 appears as a distance $d_L$ along the photo plane of a survey camera located at each perspective center 1, and it appears as a much greater distance $d_R$ along the photo plane of a survey camera located at perspective center 2. Clearly, the distance $d_R$ is significantly greater than the distance $d_L$; and, correspondingly, each of the terrain elements $\Delta_D$ appears as a small distance element $\Delta_{d_L}$ within the image distance $d_L$ and as a large distance element $\Delta_{d_R}$ within the image distance $d_R$ (see FIG. 2a which directly compares such distance elements $\Delta_{d_L}$ and $\Delta_{d_R}$). Therefore, the two similar but nonidentical images represented by the distances $d_L$ and $d_R$ cannot be registered one with the other so as to locate homologous points therein until one or the other is, or both of such images are, correctively transformed to reduce such photo plane differences at least to an extent permitting registration of the images.

In each of FIGS. 2 and 3 and for purposes of this discussion, the B/H ratio is taken to be unity or 1 with B being the base line distance between any two successive photographing stations from which a stereo pair of panoramic frames are taken, and H being the average shortest distance between the surface being photographed and the photographing stations (the measurement would actually be taken from the entrance pupil of the survey camera). Accordingly, the quantity $\Delta_p$ is equal to one-half $D$ tangent $\alpha$ with $\Delta_p$ being one-half the difference between the image distances $d_R$ and $d_L$, and being the angle of the terrain slope as measured from a horizontal reference plane.

Considering FIG. 3, it will be evident that each terrain slope produces a distinct scale difference and that an irregular terrain surface will produce a complicated pattern of relative distortions which render the images to be registered significantly different. Thus, the respective terrain elements $\Delta_D$ appear as the various distance elements $\Delta_{d_L}$ (the left to right order being observed in each instance) within the image distance $d_L$ along the photoplane as the terrain is viewed from the perspective center 1, and they appear as the distance elements $\Delta_{d_R}$ within the image distance $d_R$ along the photoplane as the terrain is viewed from the perspective center 2.

Referring again to FIG. 1, it will be seen that there are a total of ten first- and second-order transformations involving $x$ and $y$ parallaxes; and it should be noted that effecting such transformations requires the provision in a registration instrument of 10° of freedom. In addition to such transformations and the 10° of freedom required thereby, an automatic stereoscope accommodating the same must also provide means for sensing and eliminating relative image displacements in the x and y directions (i.e., zero-order transformations in the foregoing classification system), and the elimination of such displacements requires two additional degrees of freedom. Therefore, an automatic instrument able to accommodate such zero-, first- and second-order transformations must provide 12° of freedom (2° for the zero order, 4° for the first order, and 6° for the second-order transformations).

The registration system, and automatic stereoscope embodying the same, disclosed in the aforesaid copending application provides such 12° of freedom and is capable of effecting transformations of the zero, first and second order. As explained in such application, higher-order transformations can be accommodated using the techniques and principles set forth therein; and in this respect, the addition of third-order transformations would respect, the addition of third-order transformations would require the sensing and control of 8 more degrees of freedom representing the following types of transformations:

$x^3$ in $x$     $x^3$ in $y$
$x^2y$ in $x$    $x^2$ in $y$
$xy^2$ in $x$    $xy^2$ in $y$
$y^3$ in $x$     $y^3$ in $y$

Addition of fourth-order transformations would impose the requirement for ten more degrees of freedom, fifth-order transformations would add twelve more degrees of freedom, and so on. Quite evidently, then the number of degrees of freedom which must be sensed and controlled increases rapidly with order. However, an optimum instrument could have less degrees of freedom than the theoretical requirement; firstly, because projective distortions such as those produced by inclination of camera axes during exposure introduce only first- and second-order distortions between the stereo images; and secondly, because higher-order distortions are introduced by irregularities of the terrain being photographed, and although distortion orders up to the 100th may be significant under some conditions depending upon the roughness of the terrain and the resolution of the photographs, distortions arising out of terrain relief involve only x parallaxes (the x direction being the direction of movement of the survey camera in moving from perspective center to perspective center, wherefore there is no significant change in the y-direction position of the camera during such movement thereof) which therefore reduces the number of degrees of freedom for an optimum instrument to one half the theoretical maximum.

Nevertheless, such rapid increase with order in the number of degrees of freedom required, and the accompanying complexity in the instrumentation, can be undesirable in certain instances; and an object of the present invention is to provide a system by means of which second- and higher-order transformations can be accommodated in a registration instrument of the type disclosed in the aforesaid copending patent application, but with materially less complexity in the circuits for sensing and controlling such transformations. It should be emphasized that the system being disclosed herein is also suitable for processing first-order transformations although the sharp advantages concerning circuit simplicity are not so fully realized in the lower-order transformations because of the limited number of degrees of freedom required to accommodate the same.

A further object, among others, is to provide a system for effecting transformations in one or both of a pair of images, in order to register one with the other, by means of reverberatory integration in which components of a parallax error signal are selected in accordance with their harmonic relation to the scanning frequency of the flying spot scanning tubes so that the transformation produced at any point in the image area is a result not only of error signals sensed when the scanning spot is traversing the exact area under consideration, but also of error signals derived when the spot is scanning adjacent areas on previous scanning lines, whereby the displacement of the scanning spot at any point in the image resulting from the requirement for a transformation thereat is a function of error signals derived from a more or less circular area about the image point under consideration.

Further characteristics of the invention, especially as concerns particular objects and advantages thereof, will become apparent from a consideration of the following specification and drawings, the latter of which illustrate specific embodiments of the invention in which:

FIG. 1 is a graph depicting a number of image transformations;

FIG. 2 is a schematic illustration depicting a nonplanar terrain surface in relation to a pair of spaced perspective centers and a photoplane;

FIG. 2a is a diagrammatic view comparing the relative widths of terrain dimensions as they appear on the photoplanes respectively associated with the two perspective centers shown in FIG. 2;

FIG. 3 is a schematic illustration depicting a nonplanar terrain surface having both positive and negative slopes in relation to a pair of spaced perspective centers and a photoplane;

FIG. 3a is a diagrammatic view comparing the relative widths of terrain dimensions as they appear on the photoplanes respectively associated with the two perspective centers shown in FIG. 3;

Figure 4:
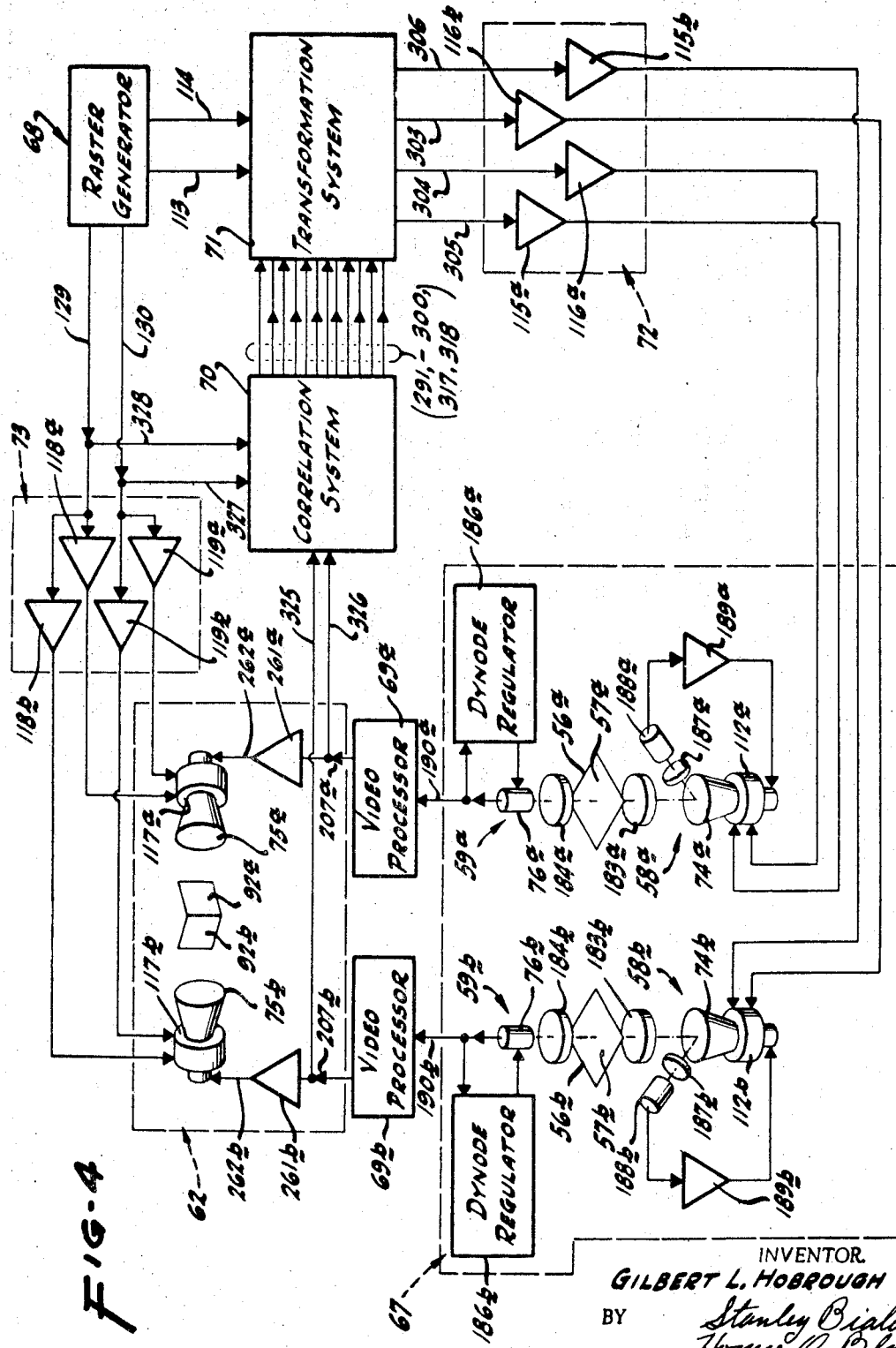

FIG. 4 general block diagram illustrating the functional interrelation of the main components of an automatic stereoscope embodying the invention, such stereoscope from the point of view of the main components thereof being the same as the stereoscope disclosed in the aforementioned copending patent application;

FIG. 5 is a diagrammatic view illustrating the characteristics of the path followed by the spot of a cathode ray tube in tracing a square-shaped dual diagonal scanning pattern;

FIG. 6 is a diagrammatic view illustrating one complete field as traced by the spot.

Figure 9:
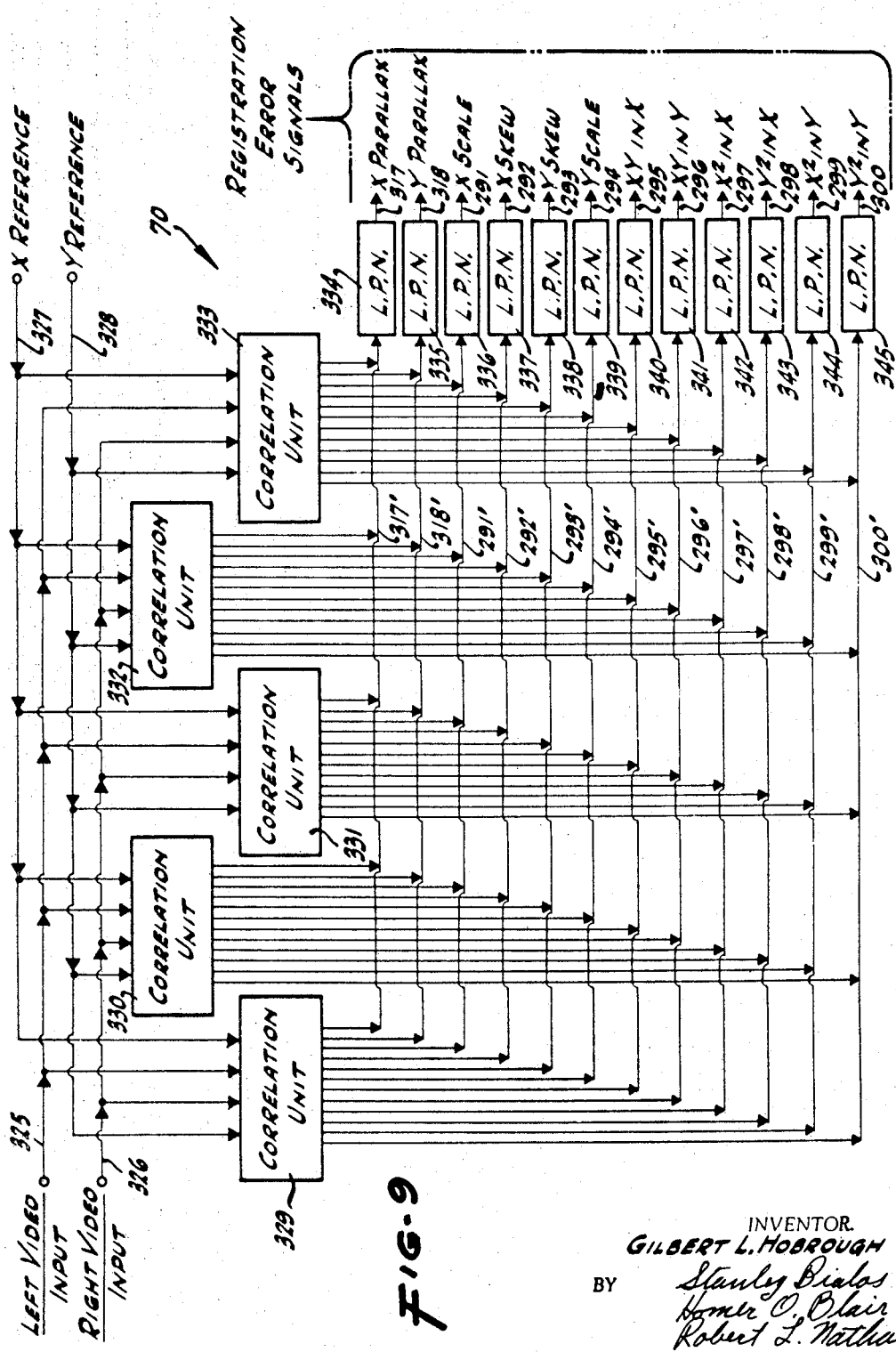
Figure 10:
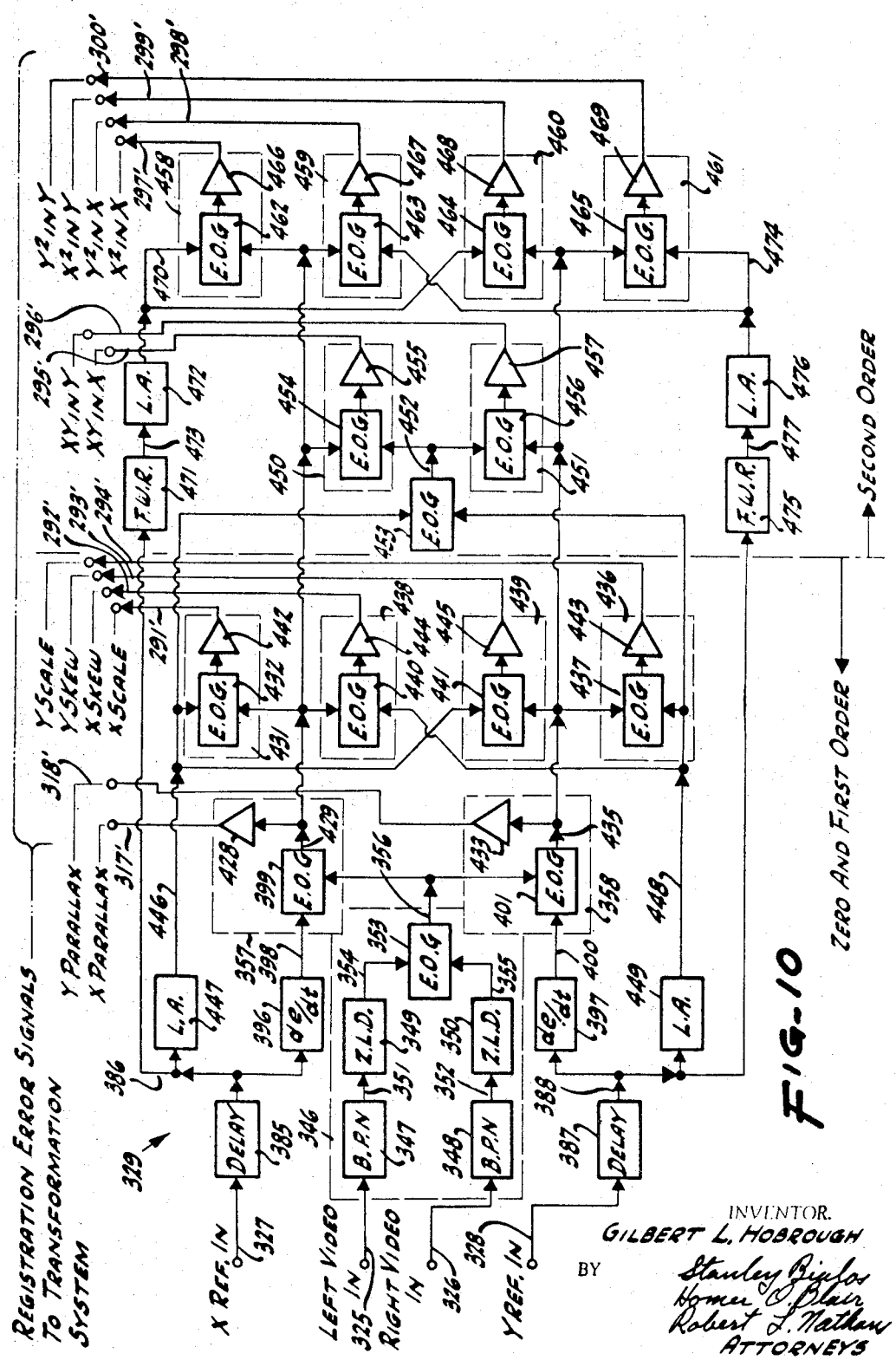
Figures 13, 14:
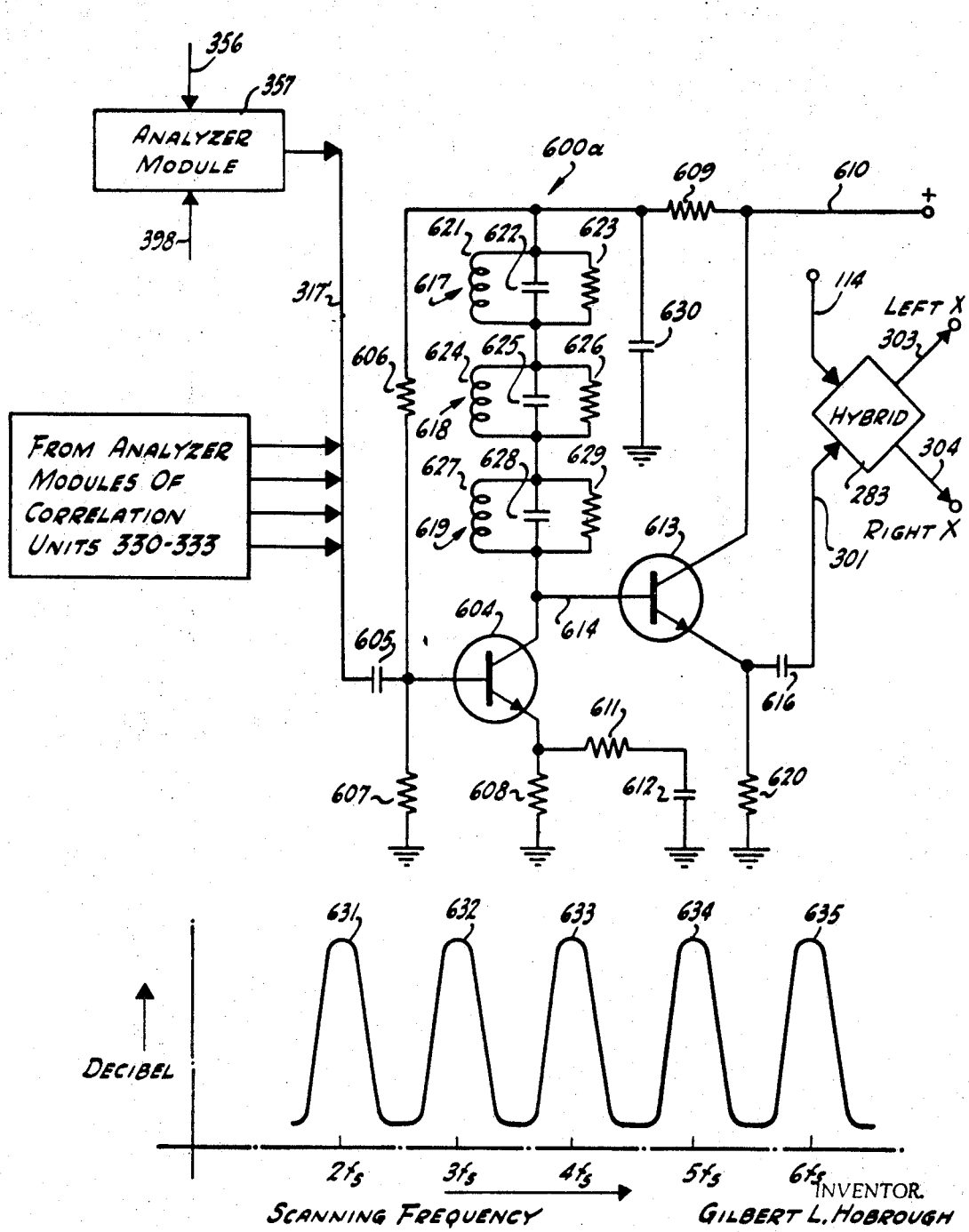

FIG. 7 is a broken, diagrammatic view illustrating one complete frame as traced by the spot, one field of the frame being shown in solid lines and the second interlaced field being shown by broken lines;

FIG. 8 is a block diagram of the transformation system comprising a part of the overall apparatus shown in FIG. 4;

FIG. 9 is a block diagram of the correlation system comprising a part of the overall apparatus shown in FIG. 4;

FIG. 10 is a block diagram of one of the correlation units employed in the correlation system illustrated in FIG. 9;

FIG. 11 is a block diagram of a fast $x$ parallax system;

FIG. 12 is a graph illustrating a frequency response curve;

FIG. 13 is essentially a schematic circuit diagram showing one form of a reverberatory integrator;

FIG. 14 is a graph showing a multiple-peak frequency response curve;

FIG. 15 is a graph illustrating the phase shift for the various frequencies comprising any one of the response peaks shown in FIG. 14;

FIG. 16 is a graph illustrating a frequency response curve;

FIG. 17 is a graph illustrating phase shift with respect to a frequency response peak for a reverberatory integrator of the type shown in FIG. 18;

FIG. 18 is essentially a schematic circuit diagram illustrating another form of a reverberatory integrator; and FIG. 19 is a block diagram of a combined correlation and transformation system embodying a reverberatory integrator.

AUTOMATIC STEREOSCOPE

General Description

As a preface to describing in particularity the characteristics of image transformation by reverberatory integration, an abbreviated description will be set forth of an automatic stereoscope in which such transformation system may be employed. This description will be made with reference to FIG. 4, in particular, which illustrates in a diagrammatic sense a pair of frame transport elements 56a and 56b respectively adapted to support thereon a pair of photographic transparencies 57a and 57b forming a stereographic pair of photographs. The apparatus also comprises a scanning system which includes a pair of substantially identical flying spot scanning assemblies generally denoted 58a and 58b, and said further comprises a light collection system including a pair of photoelectric detectors generally indicated with the numerals 59a and 59b. The scanning assemblies 58a and 58b are respectively associated with the photoelectric detectors 59a and 59b, and the scanning beams of the assemblies 58a and 58b are directed upwardly through the photographic transparencies 57a and 57b toward detectors 59 a and 59b, as diagrammatically indicated.

The image-modulated light energy of such scanning beams is collected by the photoelectric detectors, and the output signals thereof are transmitted to a binocular viewer 62 which includes a pair of eye pieces (not shown) adapted to be respectively aligned with the eyes of an operator who will view, at any instant, a stereographic model of the image areas then being scanned on the photographic transparencies 57a and 57b. The transport elements 56a and 56b are selectively movable so that the image areas aligned with the scanning beam at any instant can be changed. In FIG. 4, the scanning system comprising the assemblies 58a and 58b, the light collection system comprising the detectors 59a and 59b, and the transport system comprising the frame elements 56a and 56b are grouped together into a block defined by broken lines and which, in its entirety, is designated with the numeral 67.

The scanning and viewing components are operatively arranged in a circuit that includes a raster generator 68, a pair of video processors 69a and 69b respectively associated with the photoelectric detection networks 59a and 59b, a correlation system 70, a transformation system 71, and two groups of deflection amplifiers 72 and 73—the first of which is associated with the flying spot scanning assemblies 58a and 58b, and the second of which is associated with the viewing assembly 62. In describing the functional interrelationship of the components illustrated in FIG. 4, it will of convenience to note that the scanning assemblies 58a and 58b respectively include scanning cathode-ray tubes 74a and 74b, that the viewing assembly 62 comprises a pair of viewing cathode-ray tubes 75a and 75b, and that the light collection system comprises multiplier phototubes 76a and 76b.

In operation of the system, the stereo transparencies 57 are respectively positioned upon the support elements 56a and 56b which are dimensioned and configurated so as to fixedly constrain such transparencies with respect thereto. Usually, although not essentially, such transparencies will be glass diapositives, and the transport system is characterized by permitting the frame elements 56a and 56b to be displaced freely with respect to each other in response to slight or small-value displacement forces applied thereto. Thus, the operator can selectively shift various areas of the photographs 57a and 57b into the paths of the scanning beams transmitted from the scanning assemblies 58 to their respectively associated detector networks 59.

The raster generator 68 produces waveforms which, when amplified and applied to the deflection systems of the scanning cathode-ray tubes 74a and 74b and the viewing cathode-ray tubes 75a and 75b, produce the required scanning raster on the faces of such tubes. The correlation system 70 observes the video signals being transmitted through the video processors 69a and 69b to the viewing cathode-ray tubes 75a and 75b, and detects in such signals differences in timing between corresponding detail in the left and right channels of the apparatus. The correlation system 70 also receives reference signals from the raster generator 68, which reference signals indicate the scanning spot position in the $x$ and $y$ directions separately. From these four input signals (that is, left and right video signals and the reference or $x$ and $y$ spot coordinate signals), the correlation system 70 computes the direction of parallax errors and makes this information available in the form of error signals on lines 291—300 and 317—318.

Signals from the raster generator 68 when applied to the cathode-ray tubes 74 of the scanner and to the tubes 75 of the viewer produce a square-shaped scanning raster in each instance. The transformation system 71 develops signals which, when combined with the signals transmitted from the raster generator to the scanning cathode-ray tubes, modify the shape of the rasters on such scanner tubes. Since the raster on each of the viewer tubes remains square-shaped, the imagery as seen on such viewer tubes by the operator has transformations complementary to the change in the shape of the rasters of the flying spot scanner tubes 74a and 74b. The signals developed by the transformation system 71 are under the control of the respective transformation error signals from the correlation system 70.

If no registration error exists, then all error signals will be zero. Under these conditions, the rasters of the flying spot scanner tubes 74a and 74b remain square-shaped and there is no transformation of the imagery as seen by the operator. If, however, registration is incomplete, then one or more prime transformation error signals will be present, and a corresponding transformation will be generated by the system 71. These signals, then, when applied to the signals which otherwise would define a square-shaped raster will produce on the face of the flying spot scanner tubes a transformation of the type required to produce registration. As will be noted hereinafter, any such transformations will be applied to the left and right scanning rasters equally but in opposite senses.

The video signals being transmitted from the multiplier phototubes 76a and 76b to the respectively associated viewing cathode ray tubes 75a and 75b pass through the video processors 69a and 69b which function to provide constant image contrast or tonal range. In this respect, each video processor includes an automatic gain control operative to adjust signal amplification in such a manner that the output video amplitude remains substantially constant in spite of variations in input amplitude owing to differences in local image contrast. In this way, the full range of the viewing cathode-ray tubes 75a and 75b from dark to light is utilized.

Scanning Raster

The desired scanning raster is susceptible to both manual and electronic viewing of a stereo pair of photographic images, and employs a dual diagonal pattern comprising a plurality of interlaced fields defining one complete frame or scanning cycle (i.e., one entire scanning pattern which is then repeated). In a particular instance which has been found satisfactory, the scanning pattern defines a square-shaped raster having a frame repetition rate of 30 per second with each frame comprising an interlace of two fields. Each field is formed of substantially 205 lines to the diagonal or a total of 510 lines for a complete frame.

Such scanning pattern is illustrated in FIGS. 5 through 7 of which FIG. 5 denotes the path of movement of the traveling spot, FIG. 6 illustrates one complete field (with the number of lines reduced for clarity), and FIG. 7 depicts one complete frame comprising two interlaced fields. As indicated, each frame may comprise 510 lines in each orthogonal set of parallel lines, and the frame repetition rate may be 30 per second of the single interlace (i.e., two) fields, as shown in FIG. 7. The traveling or moving spot that develops the trace on the face of the cathode-ray tube is shown in enlarged form in FIGS. 5 and 6 and is designated for identification with the numeral 96. It is understood that the spot is developed in the conventional manner by a stream of electrons striking the coated inner face of a cathode-ray tube and, therefore, the entire area enclosed within the generally square-shaped boundaries of FIGS. 5, 6 and 7 may be taken to be a major portion of the face of such cathode-ray tube.

The spot 96 moves continuously in tracing an entire scanning pattern of one frame which comprises two interlaced fields. The general path of movement of the spot 96 is illustrated most clearly in FIG. 5 wherein it is seen that the spot changes directions by 90° as it reaches each marginal edge of the raster. Thus, the crossing orthogonal sets of parallel lines are developed in a progression in which one line of a set is traced, the spot changes direction and the first line of a normally-oriented second set is traced, the spot again changes direction and the first line of a set oppositely oriented to but parallel with the first set is then traced, again the spot changes direction and the first line of a set oppositely oriented to but parallel with the second set is then traced, and so forth. In FIG. 5, one pair of sets of parallel lines is indicated generally with the numeral 97 and the normally oriented pair of sets of parallel lines are designated generally with the numeral 98. The sets 97 as they are partially shown in FIG. 5, constitute four parallel lines which for identification are denoted as 97a, 97b, 97c and 97d. Similarly, the sets 98 as illustrated in FIG. 5 comprise three parallel lines respectively denoted with the numerals 98a, 98b and 98c.

The lines defining the orthogonal sets 97 are equally spaced from each other and, in an identical manner, the lines forming the sets 98 are equally spaced. This equality of spacing is also present in all of the parallel sets of lines forming one complete frame as shown in FIG. 7. The single field illustrated in FIG. 6 is designated in its entirety with the numeral 99, and in FIG. 7, the two fields forming the single frame 100 are respectively designated 99a and 99b.

Scanning System

The various components shown in FIG. 4 within the block 67 in direct association with the flying spot scanning tubes 74 and photosensitive devices 76 are somewhat in the nature of refinements that might be omitted if better performing cathode-ray tubes and photosensitive devices were available or economically acceptable. An exception perhaps is in each of the lens systems which first focuses the scanning beam onto the photographic transparencies 57, and then collects the light transmitted therethrough and redirects the same toward the associated multiplier phototube so as to be incident on the photosensitive cathode thereof. The various lenses are indicated diagrammatically in FIG. 4, and are designated with the numerals 183a and 184a in the case of the cathode-ray tube 74a and multiplier phototube 76a, and with the numerals 183b and 184b in the case of the cathode-ray tube 74b and multiplier phototube 76b.

As indicated hereinbefore, the photosensitive devices 76 used in the particular instrument being considered are multiplier phototubes which are advantageously employed in detecting the modulation of low intensity light because the minute current generated by light impinging on the photocathode of the tube is amplified by the action of a series of dynodes or secondary emission stages contained within the tube itself which thereby obviates the necessity of separate amplification stages which might otherwise be required to bring such minute current output to a useful magnitude.

Since the dynodes of multiplier phototubes vary widely in their electron-multiplying efficiency from unit to unit and, in addition thereto, there is a slow change in dynode efficiency throughout the useful life of multiplier phototubes which cannot be predicted with accuracy and which disturbs the amplification characteristics thereof, a dynode regulator is employed in association with each multiplier phototube 76. The dynode regulators are operative to adjust automatically the amplification of such phototubes, in response to contemporary values of the output current thereof to maintain the average current output substantially constant. In FIG. 4, the dynode regulators respectively associated with the multiplier phototubes 76a and 76b are denoted with the numerals 186a and 186b; and for the details of a specific circuit arrangement that can be used, reference may be made to the copending patent application of Gilbert L. Hobrough, Ser. No. 325,867, now U.S. Pat. No. 3,374,440, filed Nov. 26, 1963, and entitled "Dynode Control Circuit".

A pair of screen noise feedback control assemblies are shown in FIG. 4 within the block 67 in respective association with the scanning cathode-ray tubes 74a and 74b, and such assemblies have for the purpose the maintenance of a relatively uniform or constant light intensity from point to point along the faces of the associated scanning tubes. These assemblies are refinements that improve the quality of the images appearing on the faces of the viewing cathode-ray tubes 75a and 75b and, consequently, are not essential in the instrument.

In the specific form shown, such assemblies include, in the case of the scanning tube 74a, a lens system 187a which collects a part of the light appearing along the face of the scanning tube 74a and directs such light onto the photosensitive cathode of a multiplier phototube 188a. The current output of the multiplier phototube is fed to and provides the input of a conventional amplifier 189a, the output of which is fed to the cathode-ray tube 74a and is effective to alter the electron stream striking the face of the cathode-ray tube to either increase or decrease the intensity of the light resulting therefrom to make the scanning pattern of relatively uniform intensity throughout the entire area of the face.

In the usual instance, the multiplier phototube 188a will be associated with a dynode regulator, as heretofore described in connection with the multiplier phototube 76a, but such a regulator has been omitted in FIG. 4 for the purpose of simplifying the drawing. It will be evident that a similar feedback control network is arranged with the scanning cathode-ray tube 76b, and for purposes of specific identification, the lens system is denoted 187b, the multiplier phototube 188b, and the amplifier 189b.

The feedback control network in performing the function of maintaining the light intensity of the scanning spot substantially uniform throughout the face of the scanning tube, senses any tendency toward either an increase or decrease in such intensity from a predetermined norm, and the current output of the multiplier phototube changes in proportion thereto. That is to say, if the light intensity tends to diminish at any instant, the corresponding output current of the multiplier phototube will decrease, and vice versa.

The output of the amplifier is inversely related to the current input thereto from the multiplier phototube in the sense that when the input current decreases, the amplifier output increases and is fed to the scanning cathode-ray tube so as to cause the spot intensity to increase. The reverse operation occurs if the light intensity tends to increase along the face of the cathode-ray tube, in which event the output current of the multiplier phototube increases and the output of the amplifier is accordingly decreased to reduce the spot intensity.

Image Transformation System

The image transformations effected by the apparatus include, as heretofore indicated, zero-order transformations or image displacements, and these are produced by shifting and scanning rasters on the faces of the flying spot scanner tubes 74a and 74b. Such displacements of the images in the x and y directions are provided also by the relative physical displacement of one photographic transparency 57 with respect to the other as afforded by the transport system. As heretofore explained, such relative motion may be manually accommodated by the transport system. Displacement of the rasters provides rapid image movement and the physical adjustment of the photographic transparencies is by comparison relatively slow. In this way, however, a rapid-acting system is obtained by virtue of raster displacement while the physical adjustment avoids the necessity of larger raster displacements and thereby permits the optical and electronic-optical systems to work over relatively narrow field angles, thereby improving image resolution.

Figure 1:
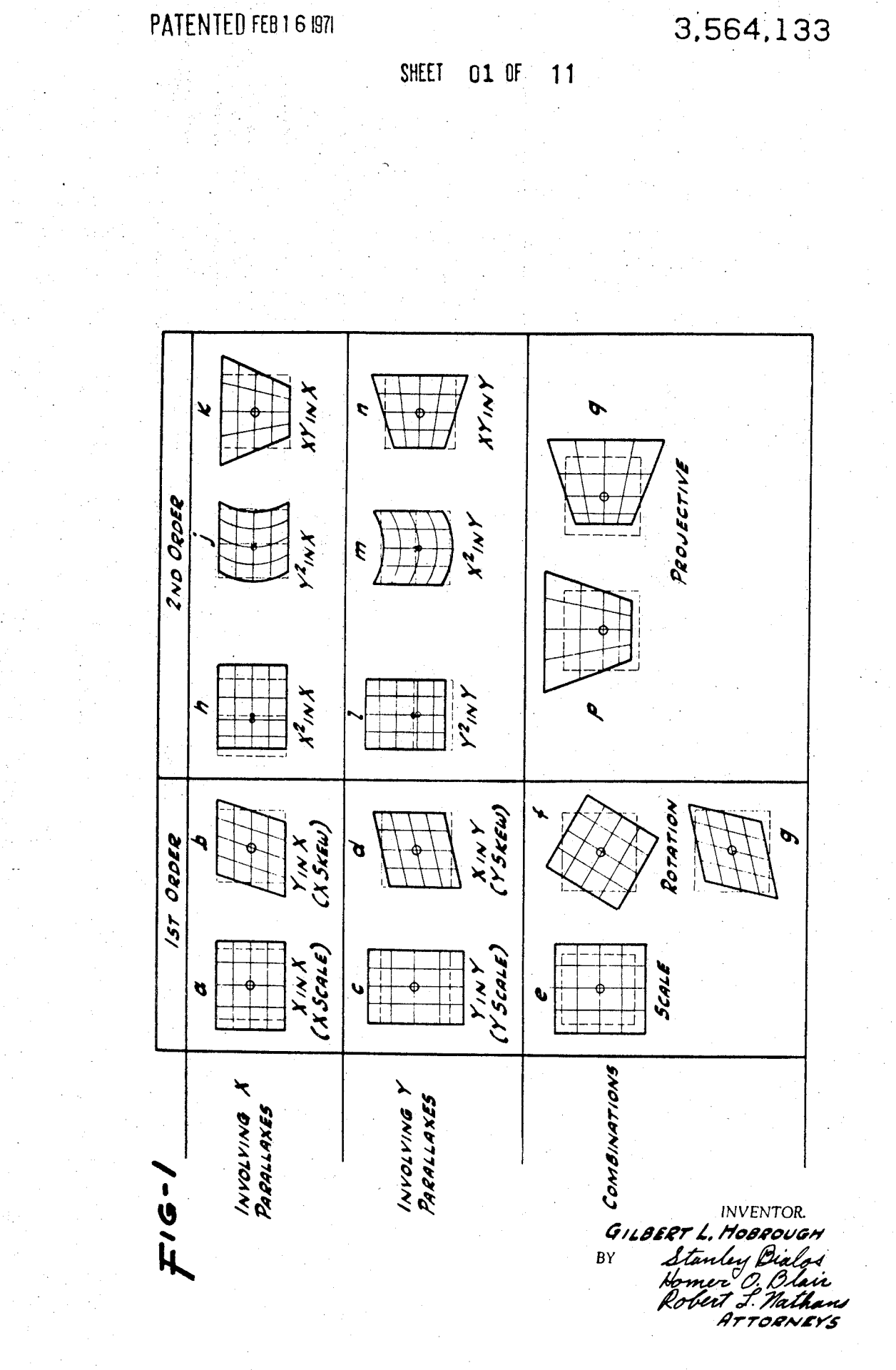

The image transformations also include the first- and second-order transformations illustrated in FIG. 1 and heretofore described; and in the particular automatic stereoscope being considered, the signals that result in the first- and second-order transformations as well as in the zero-order transformations originate in the correlation system 70 and define the various error signal inputs to the transformation system 71. However, as respects the operation of the transformation system, the manner in which the registration error signals are derived is not critical, and they could originate as manual adjustments whereupon the various transformations would be under the control of an operator who would adjust them (i.e., control signals therefore) separately by hand until the desired registration of the left and right images was attained. Thus, since signals under manual control could be supplied for each of the desired transformations to serve as input registration signals to the transformation system, the description from the functional point of view more appropriately considers the transformation system 71 prior to the correlation system 70 and such sequence will be observed herein.

Referring to FIG. 8, which is a block diagram of the transformation system 71, such system is seen to comprise a plurality of modulators—there being 10 in number respectively denoted with the numerals 270 through 279, one multiplier 280, two squaring circuits 281 and 282, two sum and difference or hybrid circuits 283 and 284, and a plurality of points of connection for the modulators, illustrated as six summing points respectively denoted with the numerals 285 through 290. Each of the prime transformation error signals is applied to a separate modulator and since there are 10 prime transformations (and 10 corresponding degrees of freedom) accommodated by the instrument, there are necessarily 10 modulators. The zero-order or x and y parallax error signals are directly fed, respectively, to the summing points 285 and 286.

The prime first-order transformations illustrated in FIG. 1 are accommodated by the modulators 270 through 273; and in a particular sense, the x-scale error signals are fed to the modulator 270 through a signal line 291, the x-skew error signals are fed to the modulator 271 through a signal line 292, the y-skew error signals are fed to the modulator 272 through a signal line 293, and the y-scale error signals are fed to the modulator 273 through a signal line 294. The $xy$ in $x$ and $xy$ in $y$ error signals are respectively fed to the modulators 274 and 275 through signal lines 295 and 296. Similarly, the $x^2$ in $x$, $y^2$ in $y$, and $y^2$ in $y$ error signals are respectively fed to the modulators 276 through 279 through the respectively associated signal line and a modulator for each of the 10 prime first- and second-order transformations illustrated in FIG. 1.

The outputs of the various modulators are added together at the respectively associated summing points; and considering firstly the prime first-order transformations, the outputs of the modulators 270 and 271, which are associated with the x parallaxes (i.e., x-scale and x-skew error signals) and with the x parallax error signal, are added together at the summing point 285 and are transmitted via a signal line 301 to the hybrid circuit 283. Similarly, the outputs of the modulators 272 and 273, which are associated with the y parallaxes and with the y parallax error signal, are added together at the summing point 286 and are transmitted via a signal line 302 to the hybrid circuit 284. The x scanning signal from the raster generator 68 is transmitted to the transformation system 71 by the signal line 114 and constitutes one of the inputs to the modulator 270 and to the modulator 272. Similarly, the y scanning signal from the raster generator 68 is transmitted to the transformation system 71 by the signal line 113 and constitutes one of the inputs to the modulator 271 and to the modulator 273.

Each of the modulators is a balanced modulator which is a type of multiplier wherein the input signals thereto are the factors and the output signal is their product. Of the two input signals to such modulator, one input (called the control) varies slowly with time or remains constant. The other input (called the carrier) is generally a repetitive waveform of relatively high frequency. In each of the modulators comprises in the transformation system 71, the registration error signals from the correlation system 70 constitute the control inputs, and the carrier inputs are derived from the scanning signals or waveforms delivered to the transformation system from the raster generator 68. The outputs of the modulators are correction signals which are added together into two groups respectively constituting the $\Delta_x$ and $\Delta_y$ correction or transformation signals which are combined with the scanning signals in the hybrid circuits 283 and 284, and the resultant signals are designated transformed scanning signals which are transmitted to the flying spot scanners 74a and 74b via the amplification system 72.

For purposes of the transformation system illustrated in FIG. 8, any balanced modulator circuit is suitable for use provided only that it performs the multiplication between the control and carrier signals (that is, the associated registration error signals and the scanning signals) accurately, and that it is capable of handling without distortion all frequency components present in the scanning signals. For a particular modulator circuit suitable for use, reference may be made to the copending patent application of Gilbert L. Hobrough, entitled "Tunnel Diode Modulator", Ser. No. 311,607, now U.S. Pat. No. 3,284,712, filed Sept. 13, 1963.

The hybrid circuits 283 and 284 are each a sum and difference circuit, the purpose of which in the transformation system of FIG. 8 is to effect transformations of the scanning rasters of the two flying spot scanner cathode-ray tubes 74a and 74b in opposite directions such that the transformation applied to the cathode-ray tube 74a is complementary to the corresponding transformation applied at any instant to the cathode-ray tube 74b. Accordingly, the hybrid circuits 283 and 284 are identical in construction and function, and the outputs therefrom constitute the inputs to the deflection amplifier 72 which comprises the four individual amplifiers 115a, 115b, 116a and 116b.

The control signal input, which constitutes the $\Delta_x$ correction signal, is transmitted to the hybrid circuit 283 on signal line 301 and the carrier signal input, which constitutes the x-scanning signal, is transmitted to such hybrid circuit on signal line 114. The carrier signal constitutes the unmodified x scanning signal from the raster generator 68, and the $\Delta_x$ correction signal constitutes the sum of the outputs of the modulators 270 and 271 as such may be modified by the outputs of the modulators 274, 276 and 277. The two output signals from the hybrid circuit 283 appear on signal lines 303 and 304, the first of which (as shown in FIG. 4) provides the input to the x deflection amplifier 116b, and the second of which provides the input to the right deflection amplifier 116a. In the case of the hybrid 284, the two outputs therefrom are denoted 305 and 306, and they are respectively connected to the right and left deflection amplifiers 115a and 115b.

More particularly, with respect to the output signals of the hybrid circuits and considering, for example, the circuit 283, the total output signal at the signal line 303 is proportional to the sum of the input signals present at the signal lines 114 and 301, and in the present instance is the sum of the amplified input signals. The total output signal at the signal line 304, however, is proportional to the difference of the input signals present at the signal lines 114 and 301, and in the present instance constitutes the difference between the amplified input signals, and specifically, the x scanning signal from the line 114 minus the $\Delta_x$ correction signal on the line 301. For a specific hybrid or sum and difference circuit which can be used, reference may be made to the copending patent application of Gilbert L. Hobrough, entitled "Hybrid Circuit", Ser. No. 308,776, now U.S. Pat. No. 3,259,758, filed Sept. 13, 1963.

Summarizing the function of the transformation system 71 illustrated in FIG. 8, it may be stated that the presence of a positive x-scale registration error signal on the line 291 will cause an increased x-deflection on the left scanner cathode-ray tube 74b, with a consequent increase in the x-dimension-width of the raster on the face thereof, as illustrated in FIG. 1a; and at the same time, there will be a decrease in the x-deflection on the right scanner cathode-ray tube 74a, with a consequent reduction in the x-dimension-width of the raster on the face thereof producing a narrow raster having a transformation opposite to that illustrated in FIG. 1a.

If the x-scale registration error signal appearing on the signal line 291 is negative rather than positive, the product waveform constituting the output of the modulator 270 will be an inverted reduced replica of the x-scanning waveform on the signal line 114 representing the product of such scanning waveform multiplied by a negative number representing the magnitude of the voltage of the x-scale error signal present on the line 291.

In this event, the signal on the output line 303 of the hybrid 283, which represents the sum of the input signals fed thereto on the lines 114 and 301, will be equal to the x-scanning signal input thereto appearing on the line 114 reduced by the amplitude of the signal on the line 301 which, since it is negative, will be in reverse phase relationship with respect to the scanning signal on the line 114. Therefore, the left x-deflection signal on the output line 303 will be reduced in amplitude and will result in a narrow raster on the flying spot scanner tube 74b.

Likewise, the output signal on the line 304 will represent the difference between the x-scanning signal input fed to the hybrid circuit on the line 114 and the reverse replica thereof appearing on the line 301 which difference, since the replica is negative, is equivalent to the sum of the signal on the line 114 and an unreversed replica thereof. Therefore, the signal on the output line 304 will be of increased amplitude and will result in a scanning raster on the right scanner cathode-ray tube 74a having an increased x-dimension-width.

Summarizing then, it can be seen that the effect of any x-scale error signal appearing on the signal line 291 is to produce an x-scale transformation of the raster of each of the flying spot scanner tubes 74a and 74b, and that the direction and magnitude of any such transformation are respectively equal to the sign and proportional to the magnitude of the error signal appearing on the line 291. Further, such transformation as applied to the left cathode-ray tube 74b is opposite in sign to the corresponding transformation applied to the right cathode-ray tube 74a.

In an entirely analogous manner, it can be shown that a y-scale error signal applied to the modulator 273 via the signal line 294 will effect a y-scale transformation of the scanner cathode-ray tubes 74a and 74b through the action of the modulator in providing a replica on the signal line 302 of the y-scanning signal fed to the modulator on the signal line 113. In this connection, the hybrid circuit 284 functions in a manner similar to that of the hybrid 283 in effecting x-scale transformations, and will correspondingly effect y-scale transformations in opposite senses on the left and right scanner cathode-ray tubes 74b and 74a.

The operation of the transformation system 71 will now be described with reference to the action taken thereby in response to the presence of a skew error signal. Assume initially that a positive x-skew error signal is being fed to the modulator 271 by the signal line 292. The modulator 271 is substantially identical to and therefore functions in the same manner as the modulator 270; and accordingly, the output of the modulator 271 will be a reduced replica of the y-scanning signal fed to the modulator via the signal line 113. Such reduced replica will be transmitted from the modulator 271 to the summing point 285, and therefore will be delivered by the signal line 301 to the input of the hybrid circuit 283.

Although the action of the modulator 271 is quite similar to that of the modulator 270 in that both deliver reproduced replicas of scanning signals to the summing point 285, and therefore to one of the inputs of the hybrid circuit 283, it should be noted that the modulator 270 introduces a reduced replica of the x-scanning signal onto the signal line 301 and that the modulator 271 introduces a reduced replica of the y-scanning signal onto the signal line 301.

As a result of the action of the modulator 271 in response to the presence of a positive x-skew error signal on the line 292, and the consequent delivery of a reduced replica of the y-scanning signal to the hybrid circuit 283, such replica of the y-scanning signal (which is the x-skew correction signal) is added by the hybrid 283 to the x-scanning signal delivered thereto by signal line 114; and the sum thereof appears on the output signal line 303. Such output signal is delivered, as previously described, to the x-deflection coil of the left flying spot scanner 74b; and since the position of the scanning spot is at any instant a linear function of the x and y deflection signals at such instant, the position of the scanning spot in the raster of the left scanner cathode-ray tube will be modified by the addition to the x-scanning signal of a signal derived from the y-scanning signal. Therefore, the square-shaped raster on the left flying spot scanner tube 74b will be transformed, as indicated in FIG. 1b.

In particular, such raster will be displaced toward the right (as viewed in FIG. 1) or in the positive x direction in the upper portion of the raster, which corresponds to the addition to the x-coordinate signal (i.e., the instantaneous value of the x-scanning signal) of a positive $\Delta_x$ correction signal which constitutes a portion of the positive y-coordinate signal (i.e., the contemporaneous instantaneous value of the y-scanning signal). Likewise, the raster will be displaced to the left or negative x direction in the lower portion of the raster corresponding to the addition to the x-coordinate signal of a negative y-coordinate signal. Evidently then, such x shift of the raster will be proportional to the value of the y-coordinate at any instant, and the shift will range from zero in the center of the raster (corresponding to the addition of a zero y-coordinate signal) to a maximum positive shift at the top of the raster which corresponds to the maximum y positive coordinate signal, and similarly, to a maximum negative shift at the bottom of the raster which corresponds to the maximum y negative coordinate signal. A corresponding complementary shift in the raster of the right scanner cathode ray tube 74a is effected by the hybrid circuit 283 via the output signal line 304 in the manner heretofore described.

If the x-skew error signal on the line 292 is of negative sign, the modulator 271 will produce a negative replica of the y-scanning waveform, which replica will be transmitted to the summing point 285 and delivered by the signal line 301 to the hybrid circuit 283. The action of the hybrid circuit 283 is then similar to that heretofore described in connection with the presence of a negative x-scale error signal on the line 291; and the negative replica or inverted waveform delivered on the signal line 301 to the hybrid circuit will be algebraically added thereby to the x-scanning waveform delivered to the hybrid via the signal line 114. The resulting waveforms appearing at the output lines 303 and 304 of the hybrid will be modified in the opposite sense relative to the waveforms appearing at such output lines when a positive x-skew error signal is transmitted to the modulator 271. Consequently, under the condition of a negative x-skew error signal, the transformations on the flying spot scanner tubes 74a and 74b will be reversed, and the transformation illustrated in FIG. 1b will then appear on the right scanner cathode-ray tube 74a, and its transformation complement will appear on the left scanner tube 74b.

The modulator 272 and hybrid circuit 284 will function in an entirely analogous manner to the presence of either a positive or a negative y-skew error signal on the signal line 293. Accordingly, the replicas of the x-scanning signal delivered to the summing point 286 and transmitted by the signal line 302 to the hybrid 284 will be added to and subtracted from the y-scanning signal, and the output signals appearing on the lines 305 and 306 will effect complementary skew transformations in the rasters appearing on the faces of the scanner cathode-ray tubes 74a and 74b, as heretofore described, to produce the y-skew transformation illustrated in FIG. 1d.

It will be apparent from the foregoing discussion that the modulators 270 through 273 are operative in combination with the hybrid circuits 283 and 284 to effect the first-order transformations illustrated in FIG. 1. The production of the second-order transformations illustrated in FIG. 1 will now be described and in this connection, the function of the modulators 276 through 279 will first be considered which respectively receive $x^2$ in x, $y^2$ in x, $x^2$ in y, and $y^2$ in y error signals via the respectively associated error signal line 298 through 300.

The modulators 276 through 279, in response to the registration error signals respectively fed thereto, multiply the associated error signals and the x and y scanning signals after squaring of the scanning signals in the respectively associated squaring circuits 281 and 282. More particularly, the squaring circuit 281 delivers to a signal line 314 a signal having a waveform proportional to the square of the x-scanning signal at any instant. Similarly, the squaring circuit 282 delivers to a signal line 315 a signal having a waveform proportional to the square of the y-scanning signal at any instant. The signal line 314 is connected to both the modulator 276 and the modulator 278 and, therefore, the output signal from the squaring circuit 281, which signal is proportional to the square of the x-scanning signal, provides one of the inputs to each of the modulators 276 and 278. In an identical manner, the signal line 315 is connected to the modulators 277 and 279 and, therefore, the output signal from the squaring circuit 282, which signal is proportional to the square of the y-scanning signal, provides one of the inputs to each of the modulators 277 and 279.

The remaining two second-order transformations—namely, the xy in x and xy in y transformations respectively illustrated in FIGS. 1k and 1n—originate in the modulators 274 and 275 in response to registration error signals fed thereto on the respectively associated signal lines 295 and 296. The modulators 274 and 275 each receive their second input via a signal line 316 from a multiplier 280 that delivers to the signal line a product signal having a waveform proportional to the product, at any instant, of the two input signal waveforms transmitted thereto by the signal lines 114 and 113—that is, the x- and y-scanning signals.

As in the case of the first-order transformations described hereinbefore, the hybrid circuits 283 and 284 introduce the second-order transformation signals in opposite senses to the left and right flying spot scanner tubes 74b and 74a to produce complementary transformations in the left and right channels.

Generally stated, the modulators 270 through 279 have been seen to act as mathematical multipliers and, therefore, it may be concluded that the transformations illustrated in FIG. 1 are essentially independent of the waveforms used to produce the scanning raster. In this respect, displacement of any undistorted coordinate position in the scanning raster is a function of such coordinate position and, therefore, of the instantaneous values of the x and y scanning signal voltages representing such position. Thus, the raster displacements or image transformations shown in FIG. 1 could be effected were television scanning rasters employed rather than the dual diagonal scanning raster specifically considered herein, although in such case the waveforms would differ in many essential respects.

It is evident from the foregoing that each of the modulators is responsive to a particular error signal input thereto; and it should be noted that the sign and the magnitude of the correction signal output from each modulator is a function of the polarity and magnitude of the registration error signal input thereto. Thus, in each instance, the greater the magnitude of the error signal input to a modulator, the greater the magnitude of the output correction signal therefrom, and vice versa.

It is evident that one or several of all of the modulators 270 through 279 may have signal outputs concurrently, and at the same time there may be parallax error signals respectively applied to the signal lines 301 and 302. Further, all such error signals might be positive, all might be negative, some might be positive and others negative, and still others might be zero —whatever combination is necessary to effect registration between left and right photographic images being scanned. In any event, all such error signals appearing at the summing points 285, 286 and 289 in the case of the signal line 301, and at the summing points 286, 288 and 290 in the case of the signal line 302, will be algebraically summed; and such total sum or $\Delta_x$ correction signal will be applied to the hybrid circuit 283 by the signal line 301, and such total sum or $\Delta_y$ correction signal will be applied to the hybrid circuit 284 by the signal line 302. The outputs of the hybrid circuits, then, constitute the original scanning signals from the raster generator as modified by the $\Delta_x$ or $\Delta_y$ (as the case may be) correction signal so that such hybrid circuits deliver transformed scanning signals to the scanning cathode-ray tubes to control the scanning rasters thereof.

The function of the transformation system 71 is conveniently summarized in mathematical terms by the following polynomials:

$\Delta_x$ correction signal $= a_1x^2 + b_1y^2 + c_1xy + d_1x + e_1y + f_1$, where $a_1x^2$ represents the $x^2$ in $x$ second-order transformation;
$b_1y^2$ represents the $y^2$ in $x$ second-order transformation;
$c_1xy$ represents the $xy$ in $x$ second-order transformation;
$d_1x$ represents the $x$ in $x$ first-order transformation;
$e_1y$ represents the $y$ in $x$ first-order transformation; and
$f_1$ represents the $x$ parallax zero-order transformation.

Correspondingly, $\Delta_y$ correction signal $= a_2x^2 + b_2y^2 + c_2xy + d_2x + e_2y + f_2$, where $a_2x^2$ represents the $x^2$ in $y$ second-order transformation;
$b_2y^2$ represents the $y^2$ in $y$ second-order transformation;
$c_2xy$ represents the $xy$ in $y$ second-order transformation;
$d_2x$ represents the $x$ in $y$ first-order transformation;
$e_2y$ represents the $y$ in $y$ first-order transformation; and
$f_2$ represents the $y$ parallax zero-order transformation.

In the case of each polynomial, the various $x$ and $y$ terms respectively represent the $x$ and $y$ coordinate signals at any instant (i.e., the instantaneous values of the $x$ and $y$ scanning signals). The coefficients $a$ through $e$, inclusive, represent the error signals transmitted to the various modulators via the respectively associated signal lines 291' through 300'. The $f_1$ and $f_2$ terms, as indicated heretofore, respectively represent the $x$ and $y$ parallax signals. Evidently, then the various $x$ terms will be zero whenever the position of the scanning spot lies on the $y$ axis (assuming the conventional $x$–$y$ Cartesian coordinate system), the various $y$ terms will be zero whenever the position of the scanning spot lies on the $x$ axis of such system, and all of the $x$ and $y$ terms will be zero only when the scanning spot is located at the origin of such $x$ and $y$ coordinate axes. Any one of the various coefficients will be zero whenever there is no misregister between the left and right photographic images of the type requiring the particular first- or second-order transformation represented by the $x$ or $y$ term associated with such coefficient. In the event that any such misregister exists, the coefficient will be either positive or negative depending upon the direction of the misregister.

From the foregoing mathematical expressions, it is apparent that the various terms in each polynomial may be of positive or negative sign and can be of various magnitudes including zero. In any event, the various terms are algebraically added to form the respective $\Delta_x$ and $\Delta_y$ correction signals which are transmitted to the associated hybrid circuits 283 and 284 and are combined thereat with the original $x$ and $y$ scanning signals from the raster generator to provide the transformed scanning signals which are then applied to the scanning cathode-ray tubes to control the scanning rasters thereof.

Correlation System

As indicated hereinbefore, the registration error signals are derived from the correlation system 70 (FIG. 4) which senses any misregister or displacement differences between the left and right photographic image areas being scanned at any instant. In this manner, the transformations of the scanning rasters can be controlled in response to the relative distortions or displacements between the two images, and the distortion reduced automatically to zero through the described action of the transformation system.

As stated hereinbefore, the disclosed stereoscope includes means by which automatic registration of a pair of stereo images is attained, and such attainment is effected through registration error signals developed in the correlation system 70 which is operative to sense any misregister or displacement differences between the left and right photographic images being scanned at any instant and produce such registration error signals in response thereto. In producing the registration error signals, the correlation system observes the video signals being transmitted through the video processors 69a and 69b to the viewing cathode-ray tubes 75a and 75b, and detects in such signals any differences in timing between corresponding detail in the left and right channels of the apparatus. The correlation system also receives reference signals from the raster generator 68, which reference signals indicate the scanning spot position in the $x$ and $y$ directions separately. From these four input signals (that is, the left and right video signals and the $x$ and $y$ scanning spot coordinate signals), the correlation system computes the direction of registration errors and makes this information available in the form of registration error signals which are fed to the transformation system 71.

In describing the correlation system, reference will first be made to FIG. 9 which is a block diagram of the system in its entirety. As seen in this FIG., the correlation system comprises an array of correlation units similarly connected to the four input terminals of the system by means of which it is connected to the raster generator 68 and to the video processors 69a and 69b. For convenience of identification, the left video input signal line is denoted with the numeral 325, the right video input signal line is designated 326, and the $x$ reference input and $y$ reference input signal lines are respectively denoted with the numerals 327 and 328. As is evident in FIG. 3, the signal line 325 is connected to the left video processor 69b or to the output signal line 207b thereof; and in a similar manner, the signal line 326 is connected to the right video processor 69a or to the output signal line 207a thereof. The $x$ and $y$ reference input signal lines 327 and 328 are respectively connected to the output signal lines 130 and 129 of the raster generator 68.

The outputs of the correlation units are added together to provide 12 registration error signals, and each of such signals is transmitted through a low-pass filter network operative to smooth the signals and control the response and stability of each of the prime transformation correction channels. The 12 registration error signals constituting the output of the correlation system 70 are fed to the transformation system 71 heretofore described; and constitute the zero-order ($x$ and $y$ parallax) error signals delivered thereto on the signal lines 317 and 318, the first-order transformation error signals respectively fed thereto on the signal lines 291 through 294, and the second-order registration error signals respectively fed thereto on the signal lines 295 through 300. Accordingly, the output signal lines of the correlation system are respectively denoted with the same numerals.

Each of the individual correlation units in the correlation system 70 is operative upon a different portion of the video spectrum. In order to effect this selection, each correlation unit includes a band-pass filter for each video input thereto. Each of the band-pass filters limits the video signals available for use in the correlation function to a fraction of the video spectrum. In the particular instrument depicted, there are five correlation units respectively denoted with the numerals 329, 330, 331, 332 and 333. The unit 329 is adapted to accept for correlation usage video signals lying within a frequency band centered on approximately 80 kilocycles per second and extending from a lower limit of about 50 kilocycles per second to an upper limit of about 120 kilocycles per second. Similarly, the correlation unit 330 is adapted to accept for correlation usage video signals lying within a frequency band centered on approximately 170 kilocycles from a lower limit of about 120 kilocycles per second to an upper limit of about 220 kilocycles per second. In the same manner, the correlation units 331 through 333 are adapted to accept for correlation usage contiguous portions of the video spectrum (respectively centered on approximately 270 kilocycles, 800 kilocycles, and 1.7 megacycles) so that the correlation units collectively are sensitive to video input signals lying in the range from approximately 55 kilocycles per second (the lower limit of correlation unit 329) to an upper frequency limit of approximately 2.5 megacycles per second (representing the upper frequency limit of the correlation unit 333). It should be noted that all of the correlation units are identical in terms of both circuit and function except for the frequency characteristics of the band-pass filters thereof. The correlation system 70 also includes a low-pass network for each registration error signal; and since there are 12 such signals, there are 12 low-pass networks which, for identification, are respectively designated with the numerals 334 through 345.

One of the correlation units comprised by the correlation system 70 is illustrated in FIG. 10, and may be taken to be any one of the correlation units 329 through 333 since, as stated hereinbefore, such units are all identical except for the band-pass filter networks included therein which make the same selective to certain specific frequency ranges in the video spectrum. For purposes of specific identification, however, the correlation unit shown in FIG. 10 will be considered to be the unit 329 and is so designated in this FIG.

The correlation unit comprises a group of modules that are symmetrically disposed with respect to the four input signals thereto. The video module to which the left and right video input signals are delivered from the video processors 69b and 69a is enclosed in chain links denoted with the numeral 346. The band-pass filters that determine the portion of the video spectrum to which the particular correlation unit is sensitive are located in the module 346 and are respectively denoted with the numerals 347 and 348, include zero-level discriminators 349 and 350 respectively connected to the band-pass networks through signal lines 351 and 352 and an EXCLUSIVE OR gate 353 which is connected to the outputs of the zero-level discriminators 349 and 350 by signal lines 354 and 355.

The band-pass networks 347 and 348 are completely conventional in design and simply operate to reject all of the frequencies of the video spectrum except those within a predetermined range or pass-band. In the case of the network 347, the video signals lying within such band are transmitted to the zero-level discriminator 349 via signal line 351; and in the case of the network 348, the video signals lying within such band are transmitted to the zero-level discriminator 350 via signal line 352. The output signals from the zero-level discriminators 349 and 350 are transmitted over signal lines 354 and 355 to the gate circuit 353—the output of which constitutes the output signal of the video module 346 and is transmitted over signal line 356 to a pair of analyzer modules respectively indicated by chain line units denoted 357 and 358.

Referring to FIGS. 4 and 9 in particular, it is seen that the x reference signal input to the correlation system is derived from the raster generator 68 and is applied to each of the correlation units from the x-reference input signal line 327. Similarly, the y-reference signal input is derived from the raster generator and is applied to each of the correlation units from the y-reference input signal line 328. The x and y reference input signals are replicas of the current waveforms in the respective x and y deflection coils of the viewer cathode-ray tubes 75a and 75b. Since the coordinate position of the scanning spot in the raster is at any instant substantially a linear function of the x and y deflection coil currents, the x and y reference signals on the lines 327 and 328 respectively represent the instantaneous position of the scanning spot raster in a Cartesian coordinate system having its origin at the center of the raster. Consequently, the sign and amplitude of the x-reference signal on the input line 327 specifies the position of the scanning spot within the raster in the x-coordinate direction. Correspondingly, the sign and amplitude of the y-reference signal on the input line 329 specifies the position of the scanning spot within the raster in the y-coordinate direction.

Referring to FIG. 10, it is seen that the x-reference signal constituting one of the inputs to the correlation unit 329 is fed to a delay line 385, which delivers at the output signal line 386 a delayed replica of the x-reference signal waveform. Similarly, the y-reference signal constituting one of the inputs to the correlation unit 329 is fed to a delay line 387, which delivers at the output signal line 388 a delayed replica of the y-reference signal waveform. The purpose of the delay lines 385 and 387 is to compensate for the delays in the video signals that occur in the video module 346. As a result of the delay lines 385 and 387, the x and y reference signals appearing on the signal lines 386 and 388 represent accurately in point of time the position of the scanning spot giving rise to the parallax information from the video module 346 appearing on the output signal line 356 thereof. The delay lines 385 and 387 can be conventional in every respect and may take the form of lumped-constant, low-pass delay lines.

Referring again to FIG. 10, the delayed x-reference signal appearing on the line 386 is delivered to a differentiator 396. Similarly, the delayed y-reference signal on the line 388 is delivered to a differentiator 397 The function of each of the differentiators 396 and 397 is to transmit a differentiated signal waveform representing the scanning spot velocity in the x and y directions separately. Since the x-reference signal represents the scanning spot position at any instant, the first derivation with respect to time of such x-reference signal as provided by the differentiator 386 will represent the scanning spot velocity at the same instant of time. Similarly, the derivation of the y-scanning signal as provided by the differentiator 397 will represent the scanning spot velocity in the y direction at any instant. In the case of the differentiator 396, the signal output therefrom is transmitted over a signal line 398 to an EXCLUSIVE OR gate 399 comprising a part of the analyzer module 357; and in the case of the differentiator 397, the signal output therefrom is transmitted over a signal line 400 to an EXCLUSIVE OR gate 401 comprising a part of the analyzer module 358.

As is evident in FIG. 10, the analyzer module 357 includes the aforementioned EXCLUSIVE OR gate 399 and an amplifier 428 connected to the output thereof. Similarly, the analyzer module 358 includes the EXCLUSIVE OR gate 401 and an amplifier 433 connected to the output thereof. The EXCLUSIVE OR gate of the respective analyzer modules 357 and 358 are identical in both circuit and function with the aforementioned EXCLUSIVE OR gate 353. The function of the analyzer modules 357 and 358 is to respectively translate the composite parallax signal present on the output signal line 356 from the video module 346 into coherent x and y parallax signals.

More particularly in this respect, the input signals to the module 357 constitute the output signal of the video module 346, which output signal is transmitted over signal line 356 from the EXCLUSIVE OR gate 353 to the EXCLUSIVE OR gate 399, and the differentiated x-deflection reference signal which is transmitted over signal line 398 from the differentiator 396 to the gate 399. Similarly, the module 358 receives as inputs thereto the output signal of the video module 346 and the differentiated y-deflection reference signal which is transmitted over signal line 400 from the differentiator 397 to the gate 401.

Generally stating the operation of the analyzer modules 357 and 358, and considering first the module 357, it delivers an x parallax error signal on the line 317′ representative of the parallax between the left and right photographic images being scanned in the x direction but not representative of any parallax existing between such two images in the y direction. Similarly, the analyzer module 358 delivers a y parallax error signal on the line 317′ representative of the parallax between the left and right photographic images being scanned in the y direction but not representative of any parallax existing between such two images in the x direction.

In the absence of average x and y parallax distortions, the signal on the line 356 from the video module will alternate between zero and positive for substantially equal periods, thereby representing a median signal. Therefore, the output of the analyzer module 357 will also have a median value regardless of the character of the reference signal present on the line 398, thereby representing a condition of zero x parallax. Similarly, the output from the analyzer module 358 will have a median value regardless of the character of the reference signal present on the line 400, thereby representing a condition of zero y parallax.

Also, it will be apparent that increasing values of x and y parallax distortions result in an increasing departure from a median signal on the line 356 and a correspondingly increasing departure from a median signal on the line 317′, in the case of x parallax, and on the line 318′, in the case of y parallax. Therefore, the sign and magnitude of the output signals on the lines 317′ and 318′ are truly representative, respectively, of the direction or sign and the magnitude of the x parallax distortion and y parallax distortion between any left and right photographic images being scanned by the flying spot scanners 74a and 74b. Referring to FIG. 9, it is seen that the corresponding outputs of the correlation units 329 through 333 (which, as heretofore explained, are identical in function except for the specific frequency portions of the video spectrum on which they operate) are added together and the summed output is applied to a low pass filter network in the group 334 through 345 thereof. Each of the low pass networks 334 through 345 is an averaging network which smoothes the error signals delivered thereto from the associated analyzer modules so that the output signal from the filter network is in each case the average value of the signals from the analyzer modules in all of the correlation units connected to any particular low pass network.

Specifically, the output of the x parallax analyzer module 357 of each of the correlation units 329 through 333 is connected to the input of the x parallax low pass network 334. Likewise, the output of the y parallax analyzer module 358 in each of such correlation units is connected to the input of the y parallax low pass network 335. If the video signals representing the left and right images being scanned have frequency components lying within the pass-band of several of the correlation units comprised by the correlation system 70, then each such unit will contribute a signal output constituting a portion of the combined registration error signal available at the corresponding output terminal of the correlation system. Conversely, if the video signals representing the left and right images being scanned contain frequencies lying within the pass-band of only one correlation unit, then the registration error signal appearing at the corresponding output terminal of the correlation system will be derived entirely from such one correlation unit. Due to the combined action of the several correlation units, a greater degree of reliability is obtained in the registration error signals than would be the case if only one correlation unit were to be used.

The foregoing explanation considered the action of the correlation unit 329 in producing zero-order or x and y parallax error signals, and the action of such unit 329 will now be described with respect to the production of first-order error signals under conditions of relative distortion between the left and right images being scanned so that a registration error signal will be produced representative of the particular distortion existing between such scanned images. In general, it may be stated that the presence of relative distortion between the images being scanned causes fluctuating parallax conditions to exist even after the average x and y parallaxes have been reduced to zero. For example, if an x-scale discrepancy exists between the left and right images being scanned, then a fluctuating x parallax signal will be developed by the analyzer module 357.

As seen in FIG. 10, the analyzer module 357 not only provides an output signal from the amplifier 428 thereof to the x parallax signal line 317′ but it also provides an output signal directly from the EXCLUSIVE OR gate 399, which output appears on the signal line 429. This signal line leads to an analyzer module 431, and in particular to an EXCLUSIVE OR gate 432 defining the input stage thereto. The function of the analyzer module 431 is to develop an x-scale error signal from the nonamplified, x parallax signal from the analyzer module 357. In an analogous manner, the analyzer module 358 not only provides an output signal from the amplifier 433 thereof to the signal line 318′, but it also provides an output signal directly from the EXCLUSIVE OR gate 434 which output appears on the signal line 435. This signal line leads to an analyzer module 436, and in particular to an EXCLUSIVE OR gate 437 defining the input stage thereto. The function of the analyzer module 436 is to develop a y-scale error signal from the nonamplified, y parallax signal from the analyzer module 358.

The correlation unit 329 also includes a pair of analyzer modules 438 and 439 respectively comprising EXCLUSIVE OR gates 440 and 441. The gate 440 is connected to the signal line 429 from the analyzer module 357 (the gate 399 thereof), and the gate 441 is connected to the signal line 435 from the analyzer module 358 (the gate 434 thereof). The analyzer modules 438 and 439 respectively detect the presence of x-skew and y-skew distortions resulting from the x parallax signal on the signal line 429 being a function of the scanning spot position in the y direction, and resulting from the y parallax signal on the signal line 435 being a function of the scanning spot position in the x direction. For purposes of specifically designating the amplifier components of each of the analyzer modules 431, 436, 438 and 439, such amplifiers are respectively denoted with the numerals 442, 443, 444 and 445.

As indicated in FIG. 10, the analyzer modules 431, 436, 438 and 439 respectively develop the first-order registration signals denoted x-scale, y-scale, x-skew and y-skew. In performing such functions, the analyzer modules 431 and 438 receive as one of the input signals thereto the x parallax signal output from the analyzer module 357 appearing on the signal line 429 therefrom. Similarly, the analyzer modules 436 and 439 receive as one of the input signals thereto the y parallax signal output from the analyzer module 358 appearing on the signal line 435 therefrom. The analyzer modules 431 and 439 receive as the other input signals thereto the undifferentiated x-reference signal appearing on the signal line 446 which is connected to the output signal line 386 from the delay circuit 385 through a limiting amplifier 447 operative to shape and limit the amplitude of the signal on the line 386. Similarly, the analyzer modules 436 and 438 receive as the other input signals thereto the undifferentiated y-reference signal appearing on the signal line 448 which is connected to the output signal line 388 from the delay circuit 387 through a limiting amplifier 449 operative to shape and limit the amplitude of the signal on the line 388. The limiting amplifiers 447 and 449 are identical in circuit detail and function to the zero lever discriminator previously described.

With respect to its function, the signal input to the limiting amplifier 447 appearing on the line 386 is proportional to the x coordinate of the scanning spot at any instant. The output signal from the limiting amplifier appearing on the line 446 has a constant positive value whenever the input signal is of positive polarity, and the output signal has a zero value whenever the input signal to the amplifier is of negative polarity. The signal on the line 446 constituting the output of the limiting amplifier indicates, therefore, only that the scanning spot is either in the right half (first and fourth quadrants) or the left half (second and third quadrants) of the raster. Similarly, and in a completely analogous manner, the action of the limiting amplifier 449 indicates only that the scanning spot is in the upper half (first and second quadrants) or the lower half (third and fourth quadrants) of the raster.

Evidently the analyzer module 431 functions to correlate the fluctuating x parallax signal output transmitted thereto from the analyzer module 357 with the x coordinate reference signal (which is undifferentiated but shaped and limited) transmitted thereto on the line 446 from the limiting amplifier 447, and to derive from these two signals a consistent x-scale error signal which appears on the line 291′. In an entirely analogous manner, the analyzer module 436 functions to detect the presence of y-scale distortion between the left and right photographic images by correlating the fluctuating y parallax signal output transmitted thereto, via signal line 435, from the analyzer module 358 with the y coordinate reference signal (also undifferentiated but shaped and limited) transmitted thereto via the signal line 448 from the limiting amplifier 449, and to derive from these two signals a consistent y-scale error signal which appears on the line 294'.

Referring to FIG. 10, it will be observed that the x-skew and y-skew registration error signals appear on the lines 292' and 293' and, therefore, must be developed by the analyzer modules 438 and 439. It will also be observed that these modules 438 and 439 receive as parallax and reference inputs thereto the same signals that were utilized by the modules 431 and 436 in the development of x- and y-scale error signals, However, in the case of the modules 438 and 439, x parallax is correlated with the y-coordinate position of the scanning spot, and y parallax is correlated with the x coordinate position of the scanning spot, respectively.

The analyzer modules 431, 436, 438 and 439 each detect the presence of first-order distortion between the left and right photographic images being scanned; and in performing this detection function, each of these analyzer modules is supplied with a reference signal derived directly from the instantaneous x and y scanning spot coordinate signals—that is to say, undifferentiated reference signals which are fed thereto from the x and y reference signal input lines 327 and 328 through the respectively associated delay lines and limiting amplifiers 385—447 and 387—449. The correlation unit 329 is also operative to detect the presence of second-order distortion between such images and, in response thereto, provide second-order registration error signals. In the specific apparatus being considered, there are six such second-order registration error signals developed.

The first two second-order error signals to be considered herein are the xy in x and xy in y signals which respectively appear on the signal lines 295' and 296' and are developed in the analyzer modules associated therewith (respectively identified in FIG. 10 by the numerals 450 and 451). Each of these two modules receives as a reference signal, supplied thereto on a signal line 452, a signal derived from both of the x and y coordinate position reference signals, Such derived signal is produced by an EXCLUSIVE OR gate 453 the input signals to which are delivered thereto via the signal line 446 from the limiting amplifier 447 (the x reference signal) and via the signal line 448 from the limiting amplifier 449 (the y reference signal). The EXCLUSIVE OR gate 453 is identical in both circuit and function with the EXCLUSIVE OR gate 353 heretofore described.

In addition to the input signal received from the EXCLUSIVE OR gate 453, the analyzer module 450 receives as an input signal thereto the x parallax signal from the aforementioned EXCLUSIVE OR gate 399 of the analyzer module 357, which parallax signal is transmitted to the analyzer module 450 via the signal line 429. The output of the analyzer module 450 constitutes the xy in x error signal appearing on the line 295', and such output signal is produced by the analyzer module 450 as a consequence of the operation of the EXCLUSIVE OR gate 454 and amplifier 455 which function in the manner hereinbefore described in connection with the analyzer module 357.

Similarly, the analyzer module 451 receives as input signals thereto the signal provided by the EXCLUSIVE OR gate 453 and the y parallax signal from the aforementioned EXCLUSIVE OR gate 434 of the analyzer module 358, which parallax signal is transmitted to the analyzer module 451 via the signal line 435. The output of the analyzer module 451 constitutes the xy in y error signal appearing on the line 296', and such output signal is produced by the analyzer module 451 as a consequence of the operation of the EXCLUSIVE OR gate 456 and amplifier 457 which function in the manner hereinbefore described in connection with the analyzer module 358.

Quite evidently, then, the analyzer module 450 in operative association with the various circuit components described functions to correlate the fluctuating x parallax signal output from the analyzer module 358 with the xy coordinate reference signal from the EXCLUSIVE OR gate 453 in a manner such that a consistent xy in x error signal is derived. In an entirely analogous manner, the analyzer module 451 functions to detect the presence of xy in y distortion between left and right photographic images being scanned by the flying spot scanners by correlating the fluctuating y parallax signal output from the analyzer module 358 with the xy reference signal from the EXCLUSIVE OR gate 453 so as to produce a consistent xy in y error signal on the line 296'.

The second-order transformations containing squared terms are illustrated in FIGS. 1h, 1j, 1l, and 1m, and are effected in response to registration error signals appearing on the signal lines 297' through 300' which are respectively connected to and define the output signal lines of analyzer modules 458, 459, 460 and 461. As in the case of the prior analyzer modules heretofore considered, each of the modules 458 through 461 comprises an EXCLUSIVE OR gate and an amplifier; and for purposes of specific identification, the EXCLUSIVE OR gates are respectively denoted 462 through 465 and, similarly, the amplifiers are respectively denoted 466 through 469. As illustrated in FIG. 10, the analyzer modules 458 and 459 receive as one of their inputs the x parallax signal transmitted thereto on signal line 429 from the analyzer module 357. Similarly, the analyzer modules 460 and 461 receive as one of their inputs the y parallax signal transmitted thereto on signal line 435 from the analyzer modules 358.

The modules 458 and 460 receive as the other input signal thereto a reference signal from a signal line 470, which reference signal is derived from the x position reference signal appearing on the line 386 after processing thereof in a full-wave rectifier 471 and limiting amplifier 472. The signal line 470 defines the output from the amplifier 472, and the full-wave rectifier is connected to the input thereof by signal line 473. Similarly, the modules 459 and 461 receive as the other input signal thereto a reference signal from a signal line 474, which reference signal is derived from the y position reference signal appearing on the line 388 after processing thereof in a full-wave rectifier 475 and limiting amplifier 476. The signal line 474 defines the output from the amplifier 476, and the full-wave rectifier is connected to the input thereof by a signal line 477.

As respects the function of the full-wave rectifiers and limiting amplifiers, the lower or negative portions of the x reference signal waveforms constituting the input to the rectifier 471, and which input is delivered thereto on the line 386, appear inverted on the output line 473 of the rectifier and are added to the uninverted upper or positive portions of the input waveforms to provide a reduced-amplitude sawtooth output waveform having twice the frequency of the sawtooth input waveform. The zero axis of the sawtooth waveform appearing on the signal line 473 is established by the input circuit to the limiting amplifier 472. The output waveform of the limiting amplifier is a square-shaped waveform and it alternates between positive and zero values in accordance with whether the input signal thereto is respectively positive or negative.

The combinative action of the full-wave rectifier 475 and limiting amplifier 476 is completely analogous to that of the rectifier 471 and its associated amplifier 472; and, therefore, these rectifier-amplifier combinations perform identical functions, respectively, in the x reference channel and y reference channel.

It is apparent from the foregoing discussion that the analyzer module 458 functions to correlate the fluctuating x parallax signal transmitted thereto on signal line 429 from the analyzer module 357 with the $x^2$ coordinate reference signal (denoted hereinafter as $x^2$) transmitted thereto on the line 470 from the limiting amplifier 472, and to derive from such signals a consistent $x^2$ in x error signal. In the absence of $x^2$ in x distortion, the x parallax signal on the line 429 will alternate between zero and positive values for substantially equal periods representing a median signal. Therefore, the output from the analyzer module 458 will also have a median value regardless of the character of the reference signal fed thereto on the line 470. Also, increasing values of $x^2$ in $x$ distortion result in an increasing departure from a median signal on the line 429 and a correspondingly increasing departure from a median signal on the output line 297'. Therefore, the sign and magnitude on the signal appearing on the line 297' are truly representative of the direction and magnitude of the $x^2$ in $x$ distortion between the left and right photographic images being scanned by the flying spot scanners 74a and 74b.

The analyzer module 461, in an entirely analogous manner, functions to correlate the fluctuating $y$ parallax signal transmitted thereto on signal line 435 from the analyzer module 358 with the $y^2$ coordinate reference signal (denoted hereinafter as $y^2$) transmitted thereto on the line 474 from the limiting amplifier 476, and to derive from such signals a consistent $y^2$ in $y$ error signal that appears on the signal line 300'.

The action of the correlation unit 329 will now be described in the presence of the second-order distortions illustrated in FIGS. 1j and 1m (namely, $y^2$ in $x$ and $x^2$ in $y$ distortions) which may be described as being curvilinear. The error signals representing such distortions respectively appear on the signal lines 298' and 299' which define the outputs from the respective analyzer modules 459 and 460. It may be concluded, therefore, that the signals for such second-order distortions are developed in these two modules.

It will be observed in FIG. 10 that the analyzer modules 459 and 460 receive as input signals the same parallax and reference signals which are utilized by the analyzer modules 458 and 461 heretofore described. However, in contrast to the modules 458 and 461 in which $x$ parallax error signals are coordinated with $x^2$ coordinate reference signals and $y$ parallax error signals are coordinated with the $y^2$ coordinate reference signals, respectively, the module 459 correlates the $x$ parallax error signal with the $x^2$ coordinate reference signal. In this respect, the EXCLUSIVE OR gate 463 of the analyzer module 459 is connected with the $x$ parallax signal line 429 and with the $y^2$ reference signal line 474; and, similarly, the EXCLUSIVE OR gate 464 of the module 460 is connected to the $y$ parallax signal line 435 and to the $x^2$ reference signal line 470.

In considering the operation of the correlation unit in producing error signals representing the curvilinear distortions shown in FIGS. 1j and 1m, the action of the analyzer module 459 will be described in producing the $y^2$ in $x$ error signal appearing on the line 298': As stated, the inputs to such module 459 constitute the $x$ parallax signal transmitted thereto on the line 429 and the $y^2$ coordinate reference signal transmitted thereto on the line 474. By referring to FIG. 1j, a comparison of the superimposed undistorted and transformed rasters shows that the $x$ parallax is positive toward the upper and lower borders of the rasters and is negative in the central regions thereof.

The analyzer module 459 functions to correlate the fluctuating $x$ parallax signal transmitted thereto on signal line 429 from the analyzer module 357 with the $y^2$ coordinate reference signal transmitted thereto on the line 474 from the limiting amplifier 476, and to derive from such signals a consistent $y^2$ in $x$ error signal. In the absence of $y^2$ in $x$ distortion, the $x$ parallax signal on the line 429 will alternate between zero and positive values for substantially equal periods representing a median signal. Therefore, the output from the analyzer module 459 will also have a median value regardless of the character of the reference signal fed thereto on the line 474. Also, increasing values of $x^2$ in $x$ distortion result in an increasing departure from a median signal on the line 429 and a correspondingly increasing departure from a median signal on the output line 298'. Therefore, the sign and magnitude of the signal appearing on the line 298' is truly representative of the direction and magnitude of the $y^2$ in $x$ distortion between the left and right photographic images being scanned by the flying spot scanners 74a and 74b.

The analyzer module 460, in an entirely analogous manner, functions to correlate the fluctuating $y$ parallax signal transmitted thereto on signal line 435 from the analyzer module 358 with the $x^2$ coordinate reference signal transmitted thereto on the line 470 from the limiting amplifier 472, and to derive from such signals a consistent $x^2$ in $y$ error signal that appears on the line 299.

Summarizing briefly the operation of the correlation unit illustrated in FIG. 10, it may be said that each of the twelve analyzer modules functions to sense misregister between the images being scanned according to the various types corresponding to the 10 prime transformations illustrated in FIG. 1, and the zero-order or $x$ and $y$ parallax transformations. Such sensing operations are performed in terms of detecting time differences between the left and right video input signals respectively transmitted to the video module 346 on the input signal lines 325 and 326, and between signals derived from the respective video input signals and the $x$ and $y$ reference signals or their derivatives. In particular, each analyzer module is effective to correlate a fluctuating parallax signal with the appropriate $x$ and $y$ reference signal or derivative thereof and to extract a registration error signal coherent with the particular reference input signal.

The analyzer module 357 is insensitive to $y$ parallax components of the output signal from the EXCLUSIVE OR gate 353 appearing on the signal line 356 therefrom. In a similar manner, the analyzer module 358 is insensitive to $x$ parallax components of the output signal appearing on the line 356. It can be shown in an analogous manner that each of the other analyzer modules is insensitive to parallax fluctuations that are not coherent with the reference signal input thereto but which may be coherent with reference signals to other modules. Therefore, each analyzer module by correlating a composite parallax fluctuation with its own particular reference signal is responsive, exclusively, to a single distortion component in such composite parallax signal. Evidently, then, the actions of the various analyzer modules may be said to be mutually independent and, accordingly, there is no interference therebetween.

As discussed hereinbefore, the specific correlation system disclosed comprises a plurality of correlation units (see FIG. 9) which are identical except for the band-pass networks (the networks 347 and 348 illustrated in FIG. 10 for the correlation unit 329). By effectively segmenting the entire video spectrum into restricted band-width portions thereof, the extent of information loss that results from clipping or reducing the amplitude of such video signals is materially lessened. Accordingly, this multiple-correlation-unit arrangement enables the use of the exceedingly simple correlation circuitry comprising the EXCLUSIVE OR gates in combination with the amplitude-limiting networks, namely, the zero-level discriminators 349 and 350, without significant loss of video information utilizable for correlation purposes.

The low pass networks 334 through 345 are identical in both circuit and function, and it may be said in general that they attenuate the signals delivered thereto so that a reduced signal level will be available at their respective output lines. Also, and in particular, the higher frequency components of the input signals applied thereto will be attenuated to a greater extent than the lower frequency components. As noted heretofore, the networks are effective to smooth the input signals thereto in order to provide output signals which vary smoothly with time. Also, these networks do not cause the feedback correction loops to be unstable.

The response time of each prime transformation correction channel is governed largely by the characteristic of the low pass networks, particularly the corner frequencies thereof. Higher corner frequencies produce more rapid response and also increase the susceptibility of the system to noise and to the temporary loss of image correlation such as may be encountered briefly in passing areas of little or no image detail in one or both of the images being scanned.

In the foregoing description of the "Automatic Stereoscope," especially as concerns the image transformation and correlation systems thereof, considerable detail has been omitted, particularly with respect to exemplary circuitry, since such details are not essential to an understanding of the present invention. Furthermore, all such details are set forth in the aforementioned copending patent application, Ser. No. 394,502, which may be referred to should a consideration of such details be desired—it being understood that the more exhaustive or specific explanation of such copending application is incorporated herein by this and the other references thereto.

REVERBERATORY INTEGRATION

General Considerations

Referring again to FIG. 8, and as noted hereinbefore, there are ten modulators in the transformation system 7—one for each of the 10° of freedom required for the first- and second-order transformations. Since each modulator requires its own error signal input, a separate registration error signal must be produced by the correlation system 70 for each modulator and the degree of freedom represented thereby. Further, and as indicated in FIG. 9, there are five correlation units (329 through 333), and each unit delivers an error signal for each of the 10° of freedom required to effect the first- and second-order transformations. The respectively corresponding error signals from the various correlation units are then summed to provide a resultant set of 10 registration error signals (not including the two zero-order or x and y parallax signals) which are transmitted to and provide the error signal inputs for the transformation circuitry illustrated in FIG. 8.

Each of the correlation units, as seen in FIG. 10 and as heretofore explained, comprises a separate multiplying correlator, in the form of an EXCLUSIVE OR gate (432, 437, 440, 441, 454, 456, and 462 through 465), for each of the aforesaid 10° of freedom, and each such multiplying correlator receives as inputs thereto both a scanning reference signal and a signal derived from the correlation in the video module 346 of the two video input signals to the unit.

Considering now, with respect to sensing and correcting distortions involving x parallaxes, the action of a reverberatory integrator in relation to the correlation and transformation systems shown in FIGS. 8—10, the input signal to such integrator will be an unfiltered x parallax signal such as that appearing on the conductor 317' in FIG. 10. In general terms it can be stated that the average value of the x parallax signal on the line 317' under various conditions of parallax and relative image distortion normally will be essentially zero because of the action of the x parallax sensing and correction circuitry or loop which (as explained heretofore) is operative to maintain in register in the x direction the images 57a and 57b being scanned. The presence of image distortions under these conditions produces fluctuations in the x parallax signal as the scanning spots move about the images and encounter areas exhibiting local parallax in either the positive or negative sense. In that the scanning pattern is periodic and regular, such fluctuations in the x parallax signal are also periodic in nature and contain multiples of both the line and field rate frequencies of the scanning pattern, which multiples depend upon the complexity of the terrain depicted in such image areas and upon the corresponding complexity of the resultant x parallax signal.

Fluctuations of the x and y parallax signals contain the information necessary to direct corrective transformations of the scanning raster; and in apparatus that includes the circuitry illustrated in FIGS. 8, 9 and 10, such parallax signals are delivered selectively to the 10 modulators 270—279 for resolution into the components representing the requisite ten degrees of freedom necessary for the first- and second-order transformations. Similarly, in the reverberatory integrator, fluctuations in the x parallax signal energize the corrective circuitry and induce corrective transformations of the scanning rasters.

As indicated hereinbefore, reverberatory integration may be used in the sensing and correction of first-order distortion (that is, for effective first-order transformation), but for purposes of simplifying the present application, it will be assumed that both zero- and first-order distortion will be sensed and corrected as shown in FIGS. 8, 9 and 10 and as explained with reference thereto (a more detailed account being presented in the aforesaid copending patent application, Ser. No. 394,502). Thus, only second- and higher-order distortions will be dealt with in particular, and prior to considering a specific embodiment of a reverberatory integrator therefor, a brief examination will be made of the nature of the spectrum of the x parallax signal in the presence of relative distortions of various types between the left and right images. In this respect, it should be noted that fluctuations of the x parallax signal which are multiples of the line frequency of the scanning raster will be used to sense the presence of high-order distortions and the lower frequency fluctuations which represent multiples of the field rate frequency of the scanning raster will be ignored.

First to be considered will be the case of the presence of simple first-order distortion between the left and right images, such as that produced by terrain slope in the x direction; and in this consideration, it will be assumed that average parallax has been reduced to zero by the action of the parallax sensing and correcting circuitry and that the x parallax signal under these conditions will alternate between positive and negative values in synchronism with the motion of the scanning spots. When each scanning spot is located to the left of the center of the image area under consideration (which image area corresponds generally to the shape and area of the scanning raster), and assuming that the terrain slope is of such a direction that a negative x parallax signal exists, then as each scanning spot moves toward the right side of each image area of scanning raster, the parallax signal will increase to zero at about the center of the image area and will become positive as the spot moves to the right thereof. This change in the parallax signal will be repeated cyclically as the scanning spots move back and forth in the x direction in response to the deflection signals. In can be seen, therefore, that terrain slope in the x direction will produce an x parallax fluctuation at the line frequency of the scanning spots and that this fluctuating parallax signal will be in phase with the x position reference signal of the scanning spots.

Under the condition of terrain slope in the y direction, the x parallax signal will fluctuate in a manner such that the average value thereof will be zero, as before, but whenever the scanning spots are in the lower half of the image areas, the sign of the signal will be, say, positive with respect to the potential thereof when the scanning spots are in the upper half of the image areas. Since each scanning spot alternates regularly in the y direction between the upper and lower halves of the image, a terrain slope in the y direction will produce a fluctuating x parallax signal of the same frequency and phase as the y position reference signal of the scanning spots.

Referring again to FIG. 10, the fluctuations of the x parallax signal are detected by the first-order correlators 431 and 438, and the resulting registration error signals therefrom actuate the modulators 270 and 271 in the transformation circuitry shown in FIG. 8. However, the significant point for consideration with reference to reverberatory integration is that any fluctuation in the x parallax signal that represents a first-order distortion is an alternating current component having a frequency equal to either the x or y line frequency and is locked in phase therewith.

Considering the nature of the x parallax signal in the presence of second-order relative image distortions, it will be assumed first that there is present an $x^2$ in x distortion such as that shown in FIG. 1h. It will also be assumed that parallaxes (zero-order distortions) and first-order distortions have been eliminated by the action of the zero- and first-order sensing and transformation loops heretofore described. Examination of FIG. 1h makes it evident that the x parallaxes both to the left and right sides of the image area are of the same sign (positive in this FIG. assuming the usual x, y Cartesian coordinate reference) and that x parallax in the central region of the image is of the opposite sign. Accordingly, as the scanning spot moves back and forth in the $x$ direction, the $x$ parallax signal on the conductor 317' will alternate between positive and negative values and the frequency of these oscillations will be twice that of the $x$ line frequency or scanning frequency in the $x$ direction.

For example, when the scanning spot is to the left of the image center, the $x$ parallax signal will be negative, let us say. As the scanning spot moves into the central region of the image, the parallax signal then will become positive, and as the spot continues to move to the right of the image center, the $x$ parallax signal will again become negative. As the scanning spot retraces such movement and travels from the right to the left of the image center, the $x$ parallax signal again becomes positive in the central regions of the image area and negative to the left thereof. Accordingly, the presence on the $x$ parallax line 317' of a signal having twice the frequency of the $x$ scanning signal (i.e., the $x$-direction line frequency) is indicative of the presence of $x^2$ in $x$ distortion between the left and right images. Similarly, it may be shown that the presence of $x$ parallax signal components having three times the line frequency of the scanning signal when traveling in the $x$ direction represents third-order relative image distortion and, in particular, $x^3$ in $x$ distortion. Correspondingly, the presence of a parallax signal having four times the $x$ line frequency would indicate the presence of fourth-order distortions, etc.

Consider next the nature of the $x$ parallax signal in the present of $y^2$ in $x$ second-order relative image distortion, as illustrated in FIG. 1j, examination of this FIG. will show that the $x$ parallax is a function of the $y$ position of the scanning spots and that the $x$ parallax has the same sign when each scanning spot is in either the top half or bottom half of the image area or scanning raster (positive in the illustration), and that the $x$ parallax is of opposite sign with respect thereto (negative in FIG. 1j) when each scanning spot is in the central regions of such image area.

For example, as the spots move from the top to the bottom of the image areas, the parallax signal will be negative, let us say; it will change to a positive value as the scanning spots traverse the central region of the image areas; and the signal will again assume a negative value as the spots move into the lower region of the image areas. As the scanning spots retrace such movement, the $x$ parallax signal will change from negative as the spots move through the lower regions of the image areas to positive as the spots traverse the central regions thereof and then to negative as the spots move into the upper regions of the image areas.

It can be seen therefore that the $x$ parallax signal in the presence of $y^2$ in $x$ distortion will fluctuate at a frequency equal to twice the line frequency of the scanning spots when moving in the $y$ direction (i.e., the $y$-direction line frequency) and will be locked in phase therewith. Accordingly, the presence on the $x$ parallax line 317' of a signal having a frequency equal to twice the $y$ scanning rate is indicative of the presence of $y^2$ in $x$ relative image distortion between the left and right hand images. Similarly, the presence of $x$ parallax signal components having three times the $y$-direction line scanning frequency represents a distortion component of the $y^3$ in $x$ type, and so on up to the higher degrees of order without limit.

Fast X Parallax System

Prior to describing in detail a specific embodiment of a reverberatory integrator and the interrelationship thereof with the correlation and transformation systems shown in FIGS. 8, 9 and 10, consideration will be given to a very simplified distortion correcting network which is illustrated in FIG. 11 in block diagram form. Such network may be referred to as a "fast $x$ parallax system," and while not practicably operative in the simplified form shown to effect second- and higher-order transformations, is included for pedagogical purposes as an aid in describing subsequently a specific embodiment of a reverberatory integration system.

Those components included in the network of FIG. 11 which correspond essentially to components heretofore described are denoted for convenience of analogy and association with the same numerals. Accordingly, the network is seen to include the video correlator module 346 which has left and right video input signals delivered thereto via the signal lines 325 and 326. The output of the module 346 is delivered via the signal line 356 to the analyzer module 357 and constitutes one of the two inputs thereto. The analyzer module 357 receives as its other input, over the signal line 398, the output signal of the differentiator 396 which has as its input the $x$ position or $x$ reference signal which is delivered thereto from the input signal line 327 via the delay circuit 385 and signal line 386.

The output of the analyzer module 357 constitutes the aforementioned $x$ parallax registration error signal from one of the correlation units (see FIG. 10 which shows the unit 329), and such signal appears on the line 317'. In a similar manner, the $x$ parallax registration error signals from the remaining four correlation units, as shown in FIG. 9, are delivered to the line 317' (which is common to all of the units), and such error signals are algebraically summed therealong. Such summation of all of the output error signals of the various correlation units is delivered by the line 317' to a band pass filtering network 600; and the filtered output from the network 600 is delivered to the signal line 301 and provides the aforementioned control signal input or $\Delta x$ correction signal defining one of the inputs to the hybrid circuit 283. The hybrid circuit 283 processes the $\Delta x$ correction signal and the $x$ scan signal which is fed thereto on the line 114, and delivers the parallax correction signals to the left and right cathode-ray tubes 74a and 74b via the signal lines 303 and 304, as heretofore described, to introduce corrective transformations into the scanning rasters of such tubes for the purpose of reducing the magnitude of any relative displacements or $x$ parallax between the two images.

As indicated hereinbefore, the components of the video correlator module 346, analyzer module 357, differentiator 396 and delay line 385 are the same as in the correlation unit 329 shown in FIG. 10; and it may be stated that the network illustrated in FIG. 11 is substantially the same as the $x$ parallax channel illustrated in FIGS. 8, 9 and 10, and heretofore described, except that the low-pass network 334 (FIG. 9) has been replaced by the filter network 600 (note that the $x$ parallax signal delivered to the transformation system 71, as shown in FIG. 8, on signal line 317, effectively passes through the transformation system without specific modification thereto via the signal line 301).

The response characteristics of the filter network 600 are shown in FIG. 12 which illustrates that in addition to a low band-pass characteristic extending through a frequency range of from about zero cycles per second to about 20 cycles per second, the filter network also has a high band-pass region extending from about 30 kilocycles per second up to about 8 megacycles per second, which high band-pass region represents a range from about twice the line frequency of the scanning system to the upper limits of the video spectrum. The low-pass portion of the network 600 is denoted in FIG. 12 with the bracket 601 and such portion fulfills essentially the same function as that of the low-pass network 334 shown in FIG. 9. In particular, the $x$ parallax error signal developed by the analyzer module 357 of each of the correlation units 329—333 is averaged over several frames of the scanning raster to derive an error signal representing $x$ parallax averaged over the entire image area. The high pass region of the filter network 600 is designated in FIG. 12 with the bracket 602, and the function of the filter network in this region is to pass fluctuations in the $x$ parallax signal in the 30 kilocycle to 8 megacycle range and thereby allow such fluctuations to influence the position of the scanning spot in the $x$ direction.

A 30 kilocycle signal represents twice the line frequency of the scanning raster (510 lines per frame multiplied by a frame repetition rate of 30 per second) and is therefore indicative of the presence of second-order distortions in the image being scanned, as heretofore explained. Correspondingly, successive higher-order distortions between such images will be represented by progressively higher frequencies lying within the band-pass region 602 up to an extreme limit defined by the limits of the video spectrum as determined by the resolution of the scanning system.

As shown in FIG. 12, the network 600 blocks frequencies in the region of from about 20 cycles per second up to about 30 kilocycles per second, which region is denoted by the bracket 603. This response region 603 of the network is effective to suppress frequency fluctuations in the $x$ parallax signal representing first-order distortions, and it is also effective to suppress lower frequency fluctuations arising from multiples of the frame and field scanning rates.

Considering now the manner in which the network of FIG. 11 operates, it will be assumed: first, that $y$ parallax has been cleared through the action of the $y$ parallax sensing and transformation circuits; second, that first-order $x$ and $y$ distortions have likewise been cleared through the action of the first-order transformation circuitry; and third, that distortions of second- and higher-orders are produced only by irregularities in the terrain, wherefore local parallaxes arising out of such second- and higher-order distortions will be in the $x$ direction only. Based on these assumptions, the fast $x$ parallax system of FIG. 11 operates generally as follows:

The presence of parallax causing signal fluctuations lying within the band-pass region 602 must arise out of parallax in the $x$ direction as a consequence of relief displacements in the terrain. By applying such fluctuation signals directly to the scanning circuits of the scanning cathode-ray tubes 74a and 74b, an immediate correction in $x$ parallax is produced on a point by point basis regardless of the order of distortion represented and regardless of the position of the scanning spot in the raster. However, and as indicated hereinbefore, there are a number of difficulties which make such fast $x$ parallax system practicably undesirable, and these difficulties arise out of the absence of a smoothing or integration of the $x$ parallax signal prior to its application to the deflection circuits of the scanning cathode-ray tubes.

In this respect, the signal on the line 356 connecting the output of the video correlator module 346 to the analyzer module 357 contains the sum and difference frequencies from the left and right video signals, the passed difference signals resulting from such difference frequencies comprise the parallax information which is utilized in parallax detection after analysis by the analyzer module 357. The sum signals resulting from such sum frequencies, however, have a frequency about double that of the video signals and are not useful for the purpose of parallax detection. Nevertheless, such sum signals are passed through the analyzer module 357 and appear on the signal line 317' at their full amplitude. Such sum signals have video components lying within the band-pass region 602 which are present by the filter network 600 into the deflection system of the scanning cathode-ray tubes and produce rapid and erratic movements of the scanning spots. Since these double video frequency signals lie within the useful spectrum for distortion detection (i.e., lying within the region 602), they cannot be removed by simple band-pass filtering.

Even if the effect of such double video frequency signal components could be eliminated, the fast $x$ parallax system as shown in FIG. 11 would suffer from another difficulty that arises out of the absence of averaging or integration of the $x$ parallax signal. More particularly, as a consequence of the absence of such averaging or integration of the $\Delta x$ correction signal appearing on the line 301, such correction signal would be a function of the error signal developed on the line 317' at any instant. Accordingly, a spurious signal could deflect the two scanning spots to such an extreme extent from their correct positions as to make further correlation impossible. Upon this occurrence, all of the correction loops would effectively be opened, including the $x$ parallax loop under consideration; and since the $x$ parallax signal would be fluctuating erratically in the absence of correlation, recovery of the system would be essentially impossible without manual intervention. A still further difficulty with the arrangement shown in FIG. 11 arises out of the instability of the $x$ parallax correction loop caused by phase shifts associated with the steep attenuation characteristics necessary in the band-pass response of the network 600.

Reverberatory Integrator of FIG. 13

A reverberatory integrator operative to effect image transformations and also obviate the disadvantageous characteristics of the band-pass filter arrangement illustrated in FIG. 11, is shown in FIG. 13 and will now be described. The circuit of FIG. 13 is generally a transistorized amplifier having a multiple-peak or comb-type pass-band characteristic as will be described in detail hereinafter. The circuit is designated in its entirely with the numeral 600a to facilitate correspondence of the location and connection thereof in the correlation system with that of the prior-described filter network 600. Further in this respect, it may be noted that FIg. 13 shows the input to the circuit 600a as being delivered thereto by the signal line 317', wherefore such input constitutes the summation of all of the unfiltered $x$ parallax signals from the correlation units 329 through 333. FIG. 13 also shows that the output of the circuit 600a is coupled to the line 301 which provides one of the inputs to the hybrid circuit 283.

The circuit 600a includes a transistor 604 connected so as to operate in the common-emitter mode, and it has delivered to the base thereof via a coupling capacitance 605 the summation of the $x$ parallax signals appearing on the signal line 317'. Bias for the transistor 604 is provided by a plurality of resistances 606, 607 and 608, the first two of which are connected in series between ground and one side of a dropping resistance 609, the opposite side of which is connected to the source of applied voltage, denoted by the conductor 610. The junction of the resistances 606 and 607 is connected to the base of the transistor 604 in common with the capacitance 605; and the resistance 608 is connected between the emitter of the transistor and ground.

The resistance 606, 607 and 608 control the operating points of the transistor 604, and the values of these resistances are selected in accordance with the characteristics of the transistor and the supply voltage available and, in this respect, standard design procedures may be followed, such as those outlined in a text entitled "Transistor Circuit Design," authored by the Engineering Staff of Texas Instruments, Inc., and published in 1963 by McGraw-Hill Book Company.

The emitter of the transistor is connected to ground through a serially connected resistance 611 and capacitance 612 which together are arranged in shunt with the resistance 608. The resistance 611 and capacitance 612 determine the alternating current impedance of the emitter of the transistor 604 and, therefore, determine the voltage gain across this stage of the circuit.

The collector of the transistor 604 is connected directly to the base of a transistor 613 by a conductor 614. The transistor 613 is arranged in the circuit in a common collector configuration, and the function of this component is to provide a low impedance drive to the signal line 301 to which the emitter is connected through a coupling capacitance 616. A further function of the transistor 613 is to maintain a high impedance on the conductor 614 and thereby avoid irregular loading on a plurality of tuned circuits 617, 618 and 619 which are connected thereto. The emitter of the transistor 613 is also connected to ground through a resistance 620 which controls the emitter operating voltage and provides a path for the flow of direct current through the transistor. The collector of the transistor is connected directly to the supply voltage line 610.

Each of the tuned or resonant circuits 617—619 comprises an inductance, capacitance and resistance, which are connected in parallel, and each circuit is tuned to one of the peaks of the aforementioned frequency response curve. For purposes of identification, the inductance, capacitance and resistance elements of the various tuned circuits are respectively denoted with the numerals 621, 622 and 623; 624, 625 and 626; 627, 628 and 629. The only other component of the circuit 600a is a capacitance 630 connected between the juncture of the resistances 606 and 609 and ground, and the function of this capacitance is to provide a low impedance path to ground for alternating current.

Each of the resonant circuits 617, 618 and 619 is tuned to a particular pass-band or frequency peak different from that of the others and, for example, the circuits 617 (i.e., the inductance 621 and capacitance 622) may be tuned to twice the line scanning frequency so as to provide a peak response accommodating second-order distortion fluctuations in the $x$ parallax signal. The circuit 618 (i.e., the inductance 624 and capacitance 625) could be tuned to three times the line scanning frequency to provide a peak response accommodating third-order distortion fluctuations in the $x$ parallax signal; and, correspondingly, the circuit 619 could be tuned to accommodate fourth-order distortion fluctuations in the $x$ parallax signal. The resistances 623, 626 and 629 may be variable, or fixed as shown, and the values thereof are selected to tailor the $Q$ of the respectively associated tuned circuits so as to establish the response peaks thereof at their designated values.

A comb-type response characteristic curve is illustrated in FIG. 14, and it it seen to comprise a plurality of pass-band peaks respectively denoted with the numerals 631, 632, 633, 634 and 635, each of which coincides with a multiple of the line scanning frequency (the symbol $fs$ being used in FIG. 14 to denote scanning frequency) and, accordingly, corresponds to a particular order of relative distortion as represented by the frequencies of the fluctuations of the $x$ parallax signal. The response curve shown in FIG. 14 has five peaks which, for example, would be respectively centered on the second, third, fourth, fifth and sixth harmonics of the line scanning frequency. Accordingly, a circuit having such response characteristics would pass $x$ parallax fluctuations representing second-, third-, fourth-, fifth- and sixth-order relative distortions between the left and right image areas being scanned. However, the circuit of FIG. 13 has been limited, for purposes of simplification, to three tuned circuits 617, 618 and 619 which, as heretofore indicated, may be taken to respectively correspond to the second-, third- and fourth-order peaks 631, 632 and 633. Such limitation is by no means necessary, and additional orders to the extent or degree required can be accommodated by simple expansion of the network 600a to include the requisite number of tuned circuits. The circuit of FIG. 13, which has a comb-type filter response of the character shown in FIG. 14, obviates the aforementioned difficulties characteristic of the fast $x$ parallax system illustrated in FIG. 11.

In this respect, and first with reference to the broad spectrum of double video frequency components in the $x$ parallax signal, a filter having a comb-type frequency response characteristic will reject all such signal components except for the small fractions thereof lying within the narrow pass-bands of the several peaks. Since the pass-bands of the individual peaks are quite narrow (that is, the product of the order of the particular peak multiplied by 60 cycles), such small fraction signal components will be reduced by approximately four orders of magnitude and, therefore, are not factors of influence in the operation of the reverberatory integration system. Second, because of the narrow response of each of the pass-band peaks, the $\Delta x$ correction signal delivered by the line 301 to the hybrid circuit 283 is not equivalent to the instantaneous $x$ parallax signal appearing on the line 317'. More particularly, since each peak in the response characteristic represents the contribution of a separate resonant circuit which is highly selective, the presence of a frequency component in the $x$ parallax signal appearing on the line 317', and which component represents distortion between the left and right image areas, must be continued for several cycles before it builds to an appreciable amplitude at the output of the circuit 600a.

Finally, the difficulty of instability as a consequence of phase shifts which occur in the closed correction loops, may be completely avoided if each peak in the response characteristic is the result of the action of a single resonant circuit which cannot produce phase shifts of more than 90° at any frequency. (Most advantageously in any optimum system, such limitation of phase shift is attained by providing two resonant circuits for each pass-band peak in the response characteristic in order to control phase shifts or time delays in the region of the response peaks, as described hereinafter with particular reference to FIG. 18). By arranging for all but one of the resonant circuits associated with each peak to be effective over only a relatively narrow spectrum, the phase shifts along the sides of the response peaks may be kept to substantially less than 180°, thereby insuring stability of the closed correction loop in accordance with normal design procedures for any system employing negative feedback.

The typical amplitude and phase response of a signal through the resonance range of a pass-band or response peak (one of the pass-bands 631—635) as produced by the circuit 600a, are illustrated in FIG. 15. As seen in this FIG., which is taken to show the pass-band 631, the signal output of the tuned circuit has a steep slope through the resonance range of frequencies, although the phase shift does not exceed 90° at any frequency within such range. Since stability of the system requires only that any phase shift not exceed 180° at any point in the spectrum where the gain of the feedback loop exceeds unity, a single resonant circuit for any pass-band or response peak (that is, one tuned circuit for each pass-band) can easily be maintained in the stable state desired provided that additional delays or phase shifts encountered in the feedback loop do not exceed 90° at points remote from the center or mid-frequency of each of the response peaks.

The steep slope characteristic, however, introduces a difficulty as a consequence of the finite width of the spectrum of the $x$ parallax signal fluctuations representing any single distortion order. Such finite spectrum width for each order arises from the fact that the distortion of any order is not generally uniform throughout the image area. Therefore, as the scanning spot moves from point to point in the image area, the frequencies representing any single distortion order will increase and diminish in response to the slope configuration of the terrain represented by the image. Such modulation of each component frequency necessarily results in the production of side bands, in accordance with conventional modulation theory, and such side bands will differ in frequency from the value representing a steady-state distortion.

The steep slope of the phase characteristic shown in FIG. 15 will cause such side band frequencies to experience differential delays as a result of which the $\Delta x$ correction signal component delivered to the line 301 by the circuit 600a will not arrive in proper time phase to produce a precise correction or transformation of the scanning rasters except for those frequency components lying very close to the centers of the response peaks. Such differential delays are evidenced in FIG. 16 which shows envelope distortion for a single resonant circuit and illustrates that there is a difference in delay time for the various frequency components comprising a single distortion order of the error signal (i.e., a difference in delay time through the resonance range of any single pass-band). This difficult arising from the differences in delay times can be obviated in a manner now to be described.

REVERBERATORY INTEGRATOR OF FIG. 18

FIG. 17 illustrates the response characteristics of a filter circuit (shown in FIG. 18 and to be described subsequently) in which each resonant response peak or pass-band is produced by the functional cooperation of two resonant circuits arranged to produce a minimum variation in envelope delay. It is seen in FIG. 17 that the slope of the phase shift is substantially reduced from that shown in FIG. 15 (note the change in scale), but that the ultimate phase shift, unfortunately, approaches 180° at frequencies remote from the center or mid-frequency of the response peak. The broken line 636 in FIG. 17 depicts the effect which may be achieved in the response characteristic by narrowing the resonance range of one of the two tuned circuits so that at frequencies remote from the center of the response peak, the ultimate phase shift becomes approximately 90° and approaches a maximum value of 135° at frequencies somewhat closer to the center of the response peak. In this manner, stability can be attained since the maximum phase shift is well within the 180° limit heretofore explained.

A reverberatory integrator having such characteristics and attributes is illustrated in FIG. 18 and is designated in its entirety with the numeral 600b. As in the case of the circuit 600a illustrated in FIG. 13, the interposition of the circuit 600b in a correlation system is shown, and it will be noted that input signals are delivered to the circuit from the analyzer module 357 of each of the correlation units 329 through 333 by the signal line 317', and that the circuit output is coupled by the signal line 301 to the hybrid circuit 283. Generally stated, the circuit 600b is a transistorized amplifier having a plurality of tuned resonant circuits arranged in pairs so that each such pair provides a response characteristic similar to that depicted by the broken-line curve 636 in FIG. 17.

It will be noted that the circuit 600b is quite similar to the circuit 600a, and in terms of specific elements, differs therefrom only to the extent that the resistance 611 and capacitance 612 in the emitter circuit of the transistor 604 (FIG. 13) have been replaced by a plurality of resonant circuits. Accordingly, the same reference numerals are employed in FIG. 18 to identify the respectively corresponding components except that the suffix b has been added for purposes of differentiation.

More particularly, the reverberatory integrator 600b includes three additionally tuned circuits connected to the emitter of the transistor 604b, and such tuned circuits are respectively denoted with the numerals 637, 638 and 639. Each of the circuits comprises a series connected inductance, capacitance and resistance, and all of the three circuits are connected in parallel. For purposes of positive identification, the inductance, capacitance and resistance elements associated with the three tuned circuits are respectively denoted with the numerals 640, 641 and 642; 643, 644 and 645; and 646, 647 and 648. To facilitate subsequent description, it may be assumed that the circuits 637, 638 and 639 are respectively tuned close to the response frequencies of the circuits 617, 618b and 619b; and that such circuits in the order of their numerical progression are intended to respond to frequencies representative of second-, third- and fourth-order distortions.

The resistances 642, 645 and 648 may be variable, or fixed as shown, and are operative to control the $Q$ of the respectively associated resonant circuits in the emitter of the transistor 604b in the same manner as the resistances 623b, 626b and 629b control the $Q$ of the resonant circuits respectively associated therewith in the collector of the transistor 604b, as heretofore described with respect to the circuit 600a. The circuit 600b functions similarly to that of the circuit 600a except that the resonant impedance of the tuned circuit networks 637, 638 and 639 drops from a maximum value determined by the resistance 608 b to a minimum value determined by the resistance 642, in the case of the circuit 637, and by the resistances 645 and 648 for the circuits 638 and 639, respectively.

At frequencies corresponding to the center frequencies or response peaks of the tuned circuits, the overall gain of the circuit 600b will rise quite abruptly because the output signal delivered to the line 301 will constitute the relatively large output signals of both tuned circuits in each pair thereof. At frequencies remote from such response peaks, the overall gain of the circuit will fall off quite rapidly because the impedance of the resonant circuits 617b, 618b and 619b decreases and the impedance of the circuits 637, 638 and 639 increases. The effect of the rising impedance of the tuned circuits 637, 638 and 639 is limited, however, by the resistance 608b which is operative to suppress the attenuation of these tuned circuits. Therefore, at frequencies remote from the center frequencies or response peaks of the tuned circuits, only the circuits 617b, 618b and 619b are effective to provide the output signal on the line 301. In this manner, then, a response characteristic similar to that indicated by the curve 636 in FIG. 17 is obtained.

At less remote frequencies which lie within the central region of each resonance range where both of the respectively associated tuned circuits in each pair thereof are operative to contribute to the overall response of the circuit 600b, the phase shift and time delay characteristics present near the response peak are obtained. At frequencies more remote from such central region, the attenuation of the tuned circuit (or circuits) in the emitter of the transistor 604b is suppressed by the action of the resistance 608b and the overall response of the circuit tends to be that of a single tuned circuit (i.e., the tuned circuit—or circuits—617b, 618b or 619b, as the case may be).

Since the resonant circuits 617b, 618b, 619b, 637, 638 and 639 are all tuned quite accurately to multiples of the line scanning frequency, a raster transformation (i.e., scanning spot displacement) produced at any point in the image area is a result not only of error signals sensed when the scanning spot is traversing the exact area under consideration, but also of error signals derived when the scanning spot was previously traversing adjacent areas on prior scanning lines. In this way, corrective displacement of the scanning spot at any point in the image area resulting from the requirement of a transformation thereat is a function of registration error signals derived from a generally circular area about the image point under examination. Thus, the transformed scanning signals on lines 303 and 304 effecting a raster transformation at any point in the image area are the resultant of a plurality of signals, many of which are from nearby points in the image area, all averaged together or integrated to provide a $\Delta x$ correction signal on the line 301 appropriate to effect the corrective transformation.

SUMMARY

As indicated hereinbefore, image transformation by means of reverberatory integration materially reduces the complexity of the circuitry necessary both in the correlation system which develops registration error signals and in the transformation system which produces initially $\Delta x$ and $\Delta y$ correction signals and finally the transformed $x$ and $y$ scanning signals. With respect to further considering such reduction in complexity, reference will be made to FIG. 19 which illustrates one of the aforementioned correlation units (specifically the correlation unit 329 shown in FIG. 10) in combination with the prior-described transformation system 71 as each is modified by incorporation of a reverberatory integrator in the $x$ channel to accommodate second- and higher- order distortions (reverberatory integration in the $y$ channel is not necessary, and it may be noted that simultaneous reverberatory integration in the $x$ and $y$ channels requires the $x$ and $y$ line frequencies to differ by more than the widths of the frequency peaks in the comb-type filters of the integrators that would be employed in such channels).

Comparing FIG. 19 with FIG. 10, it will be noted that all of the components necessary to sense zero- and first-order distortions and to produce registration error signals in response thereto are embodied totally in the modified system of FIG. 19; and for ready identification, such embodied components are those which lie to the left of the broken line extending from top to bottom of FIG. 10 at approximately the midpoint thereof and which left-hand area is denoted Zero And First Order. Comparing FIG. 19 with FIG. 8, it will be noted that all of the components necessary to produce first-order $\Delta x$ and $\Delta y$ correction signal elements (namely, the modulators 270 through 273) are incorporated in the circuit of FIG. 19 (zero-order or $x$ and $y$ parallax registration error signals are transmitted directly through the transformation system via signal lines 301 and 302 and require the presence of no specific modulator components in the transformation system). The modified circuit of FIG. 19 also includes from the transformation system 71 illustrated in FIG. 8, the two hybrid circuits 283 and 284 which permit corrective transformation both in the x direction and in the y direction to be imparted in opposite senses to the scanning rasters of the two flying spot scanners 74a and 74b.

More specifically as concerns the composite correlation-transformation system of FIG. 19, and assuming properly the situation in which zero- and first-order transformations are effected in the manner disclosed in the correlation and transformation systems illustrated in FIGS. 10 and 8, the x and y parallax signals (zero-order signals) respectively present on the signal lines 317' and 318' are transmitted to the respectively associated hybrid circuits 283 and 284 via the low-pass networks 334 and 335 and the signal lines 317–301 and 318–302 respectively associated therewith. Similarly, the x scale, x skew, y skew, and y scale registration error signals (first-order registration error signals) respectively appearing on the lines 291', 292', 293' and 294' are transmitted to the associated modulators 270, 271, 272 and 273 via the low-pass network and signal line combinations 336–291, 337–292, 338–293, and 339–294. Evidently, the corresponding zero- and first-order registration error signals from the other correlation units 330—333 (each of which is modified, as in the arrangement of FIG. 19, so as to omit the second-order components to the right of the broken line in the circuit illustration of FIG. 10) are connected to the appropriate signal lines 317', 318', 291', 292', 293' and 294' on the correlation side of the low-pass networks, as in the correlation system shown in FIG. 9.

Second-order distortions and the requisite transformations for correcting the same are accommodated in the modified circuitry of FIG. 19 by including a reverberatory integrator 600b (or the single-tuned circuit integrators 600a) which takes the place of all of the second-order registration error signal components present in the correlation unit 329 shown in FIG. 10, and which also makes unnecessary the modulators 274—279, multiplier 280, and squaring circuits 281 and 282 in the transformation system 71 illustrated in FIG. 8. Additionally, as explained hereinbefore, the reverberatory integrator provided in the x channel can accommodate not only second-order distortions, but also third-, fourth-, fifth- and higher-order distortions simply by increasing the number of tuned circuits in the integrator since it is only necessary to provide tuned circuits for each distortion order to be accommodated. Thus, the circuit 600b, shown in FIG. 18, is able to accommodate in the form illustrated second-, third- and fourth-order distortions.

The x-channel reverberatory integrator 600b receives as its input signal the summation of the x parallax registration error signals from all of the correlation units and which signals appear on the line 317', and it delivers its output signal directly to the hybrid circuit 283 via the summing point 285 and signal line 301.

Evidently, then, all of the elemental signals or signal components which together constitute the $\Delta x$ correction signal present on the line 301 appear at the summing point 285 and constitute all of the signal components necessary to effect corrective zero-, first-, and higher-order transformations in the x-channel. The distortion orders may be increased essentially without limit and without introducing further complexity except for the addition of tuned circuits in each of the reverberatory integrators for each distortion order added. In the y-channel those signal components constituting the $\Delta y$ correction signal present on the line 302 appear at the summing point 286 and accommodate zero- and first-order transformations. Clearly, the complexity of both the correlation and transformation systems is materially reduced by use of the reverberatory integration techniques, especially as the distortion orders to be accommodated increase.

In the two transformation systems illustrated in FIGS. 8 and 19, the raster transformation are applied at the same time to each of the flying spot scanners 74a and 74b. This is not a requisite condition, however, and registration of a pair of images is readily obtained by applying the transformations exclusively to one or the other of the flying spot scanners. In the event of such exclusivity, the hybrid circuits 283 and 284 could be omitted since their function is to modify in opposite senses the x scanning signals, in the case of the hybrid 283, applied to the left and right scanning cathode ray tubes 74b and 74a to effect complementary transformations of the rasters thereof; and similarly to modify in opposite senses the y scanning signals in the case of the hybrid 284.

Should the transformations be performed on the raster of only one of the scanners, the hybrid circuits 283 and 284 could be replaced by simple summing points, such as the point 285 along the signal line 301. In this way, the $\Delta x$ correction signal present on the line 301 could be applied, for example, to the left scanner tube by adding at each summing point 285 the x scanning signal present on the line 114 and the $\Delta x$ correction signal present on the line 30; and then taking the output of such summing point directly to the output line 303. Since, in such example, the x transformation is not desired on the right scanner tube, the output line 304 would bypass the hybrid circuit and would be directly connected to the x scanning signal line 114. Similar changes would be made with respect to the $\Delta y$ correction signal circuit.

From the foregoing, it is evident that the reverberatory integration system described effects second- and higher-order distortion-correcting image transformations by means of which homologous areas in similar photographic transparencies, or other images, can be brought into registration; and in accomplishing this result, parallax signal fluctuations which are multiples of the line scanning frequency are used. Usually, whole multiples are employed which, therefore, are related harmonically to the scanning frequency. In that the addition of a simple filter network to the circuitry is all that is required to accommodate each higher order of distortion, considerable circuit simplicity results.

For purposes of presenting a specific example of component values in typical illustrative circuits, the following may be considered:

The Reverberatory Integrator Illustrated in FIG. 13

| | | |
|---|---|---|
| Transistor | 604 | 2N708 |
| Capacitance | 605 | 0.1 microfarad |
| Resistance | 606 | 10 k ohms |
| Resistance | 607 | 10 K ohms |
| Resistance | 608 | 1.0 K ohms |
| Resistance | 609 | 2.2 K ohms |
| Resistance | 611 | 100 ohms |
| Capacitance | 612 | 10 microfarads |
| Transistor | 613 | 2N708 |
| Capacitance | 616 | 1.0 microfarad |
| Resistance | 620 | 1.0 K ohms |
| Inductance | 621 | 5.6 millihenries |
| Capacitance | 622 | .005 microfarad |
| Resistance | 623 | 5.0 K ohms |
| Inductance | 624 | 3.7 millihenries |
| Capacitance | 625 | .033 microfarad |
| Resistance | 626 | 7.5 K ohms |
| Inductance | 627 | 2.8 millihenries |
| Capacitance | 628 | .0025 microfarad |
| Resistance | 629 | 10 K ohms |
| Capacitance | 630 | 10 microfarads |

Voltage supply potential between supply lines 610 and ground—20 Volts DC

| | | |
|---|---|---|
| Resistance | 608b | 1.0 K ohms |
| Inductance | 640 | 56 microhenries |
| Capacitance | 641 | 0.05 microfarad |
| Resistance | 642 | 500 ohms |
| Inductance | 643 | 37.3 microhenries |
| Capacitance | 644 | .033 microfarad |
| Resistance | 645 | 200 ohms |
| Inductance | 646 | 2.8 microhenries |
| Capacitance | 647 | .025 microfarad |
| Resistance | 648 | 100 ohms |

(The other components of the circuit have values the same as the respectively corresponding components in the circuit of FIG. 13. The supply potential is also the same).

It should be appreciated that the specific circuit values set forth imply no criticality and can vary greatly depending on internal and external parameters, the choice of transistors, the specific function intended for the circuit in any environmental setting, etc.

While in the foregoing specification embodiments of the invention have been set forth in considerable detail for purposes of making adequate disclosures thereof, it will be appreciated by those skilled in the art that considerable changes may be made in such details without departing from the spirit and principles of the invention.

I claim:

1. In a method of transforming the scanning raster of a flying spot scanner to correct for distortion with respect to a reference of an image being scanned by said scanner, the steps of: comparing the video output signal of the flying spot scanner which corresponds to said image being scanned with a signal representative of such reference to detect the presence of time differences between the signals and deriving from any time differences therebetween a parallax signal proportional to any parallax between such image and the reference therefor; selecting from such parallax signal a component thereof constituting a multiple of the scanning frequency of said flying spot scanner to obtain a correction signal; and combining such correction signal with a deflection signal for said flying spot scanner to effect a corrective transformation in the scanning raster thereof, deriving from any time differences between said video output signal and signal representative of such reference an additional parallax signal, one such parallax signal being proportional to any parallax along one axis of said scanning raster and the other parallax signal being proportional to any parallax along another axis thereof; selecting from said additional parallax signal a component constituting a multiple of the scanning frequency along said one axis of the scanning raster to obtain an additional correction signal, the first-mentioned signal component being a multiple of the scanning frequency along the other such axis of the scanning raster; and respectively combining such correction signals with the deflection signals for said flying spot scanner to effect a corrective transformation of the scanning raster thereof along each such axis.

2. In a method of transforming the scanning raster of at least one of a pair of flying spot scanners to correct for relative distortion of a pair of images respectively scanned by said scanners to enable registration of such images, the steps of: comparing the video output signals of the flying spot scanners which correspond to said images being scanned to detect the presence of time differences between the signals and deriving from any time differences there between a parallax signal proportional to any parallax between such images; selecting from such parallax signal a component thereof constituting a multiple of the scanning frequency of said flying spot scanners to obtain a correction signal; combining such correction signal with a deflection signal for at least one of said flying spot scanners to effect a corrective transformation in the scanning raster thereof, deriving from any time differences between said video output signals an additional parallax signal, one such parallax signal being proportional to any parallax along one axis of said scanning rasters and the other parallax signal being proportional to any parallax along another axis thereof; selecting from said additional parallax signal a component constituting a multiple of the scanning frequency along said one axis of the scanning rasters to obtain an additional correction signal, the first-mentioned signal component being a multiple of the scanning frequency along the other such axis of the scanning rasters; and respectively combining such correction signals with the deflection signals for the aforesaid one flying spot scanner to effect a corrective transformation of the scanning raster thereof along each such axis.

3. The method according to claim 2 and further including the step of combining each of said correction signals with the respectively corresponding direction signals of each of said flying spot scanners in algebraically opposite senses so as to transform correctively said scanning rasters in opposite directions and thereby reduce the magnitude of the transformation otherwise required for one raster.

4. In a method of transforming the scanning raster of at least one of a pair of flying spot scanners to correct for relative distortion of a pair of images respectively scanned by said scanners to enable registration of such images, the steps of: comparing the video output signals of the flying spot scanners which correspond to said images being scanned to detect the presence of time differences between the signals and deriving from any time differences therebetween a parallax signal proportional to any parallax between such images; selecting from such parallax signal a component thereof constituting a multiple of the scanning frequency of said flying spot scanners to obtain a correction signal; combining such correction signal with a deflection signal for at least one of said flying spot scanners to effect a corrective transformation in the scanning raster thereof, combining said correction signal with the respectively corresponding deflection signals of each of said flying spot scanners in algebraically opposite senses so as to correctively transform said scanning rasters in opposite directions and thereby reduce the magnitude of the transformation otherwise required for one raster.

5. In apparatus for effecting registration of homologous areas in a pair of similar images, a pair of flying spot scanners for respectively scanning such images, a raster generator for developing the deflection signals for each scanner to provide the scanning rasters thereof, a correlator for comparing the video output signals of said flying spot scanners to provide therefrom a parallax signal representative of relative displacements between such homologous image areas, a frequency selection module including an amplifier having a band-pass filter tuned to a multiple of the scanning frequency of said scanners for selecting from such parallax signal a component thereof constituting a multiple of the scanning frequency of said scanners to obtain a correction signal, and means for combining such correction signal with a deflection signal from said raster generator to one of said flying spot scanners to effect a corrective transformation in the scanning raster thereof.

6. The apparatus according to claim 5 in which said amplifier includes a transistor having base and collector elements, said base being connected with said correlator for receiving such parallax signal, and said filter being connected in the collector circuit of said transistor.

7. The apparatus of claim 6 in which an additional passband filter is provided, said transistor having an emitter and said additional filter being connected in the circuit thereof, one of said filters having a narrower band width than the other.

8. In apparatus for effecting registration of homologous areas in a pair of similar images, a pair of flying spot scanners for respectively scanning such images, a raster generator for developing the deflection signals for each scanner to provide the scanning rasters thereof, a correlator for comparing the video output signals of said flying spot scanners to provide therefrom a parallax signal representative of relative displacements between such homologous image areas, a frequency selection module for selecting from such parallax signal a component thereof constituting a multiple of the scanning frequency of said scanners to obtain a correction signal, and means for combining such correction signal with a deflection signal from said raster generator to one of said flying spot scanners to effect a corrective transformation in the scanning raster thereof, said frequency selection module including a plurality of filter networks one of which has a pass-band tuned to the aforesaid multiple of the scanning frequency and the others respectively having pass-bands tuned to other multiples of the scanning frequency, all of the selected multiples being combined to define the aforementioned correction signal.

9. The apparatus of claim 8 in which each of said filter networks comprises a pair of pass-band filters respectively tuned to one of the multiples of the scanning frequency, one of said filters in each pair thereof having a narrower band width then the other.

10. The apparatus of claim 9 in which said frequency selection module further comprises an amplifier including a transistor having base, collector and emitter elements, said base being connected with said correlator for receiving such parallax signal, and one filter in each pair thereof being connected in the collector circuit of said transistor and the other filter in each pair thereof being connected in the emitter circuit of said transistor.

11. In apparatus for effecting registration of homologous areas in a pair of similar images, a pair of flying spot scanners for respectively scanning such images, a raster generator for developing the deflection signals for each scanner to provide the scanning rasters thereof, a correlator for comparing the video output signals of said flying spot scanners to provide therefrom a parallax signal representative of relative displacements between such homologous image areas, a frequency selection module for selecting from such parallax signal a component thereof constituting a multiple of the scanning frequency of said scanners to obtain a correction signal, and means for combining such correction signal with a deflection signal from said raster generator to one of said flying spot scanners to effect a corrective transformation in the scanning raster thereof, means in said correlator to provide from the comparison of the video output signals of said flying spot scanners an additional parallax signal, one such parallax signal being representative of relative displacements of such image areas along one axis of such scanning rasters and the other parallax signal being representative of relative displacements between such image areas along another axis of such rasters, an additional frequency selection module for selecting from such additional parallax signal a component thereof constituting a multiple of the scanning frequency of said scanners along one such axis to obtain an additional correction signal, the first-mentioned parallax signal component constituting a multiple of the scanning frequency of said rasters along the other such axis, and additional means for combining such additional correction signal with the other deflection signal from said raster generator to the aforesaid one flying spot scanner so that a corrective transformation thereof is effected along each such axis.

12. The apparatus of claim 11 in which each of said frequency selection modules includes a filter network having a pass-band tuned to the aforesaid multiple of the scanning frequency along the associated axis of the scanning rasters.

13. In apparatus for effecting registration of homologous areas in a pair of similar images, a pair of flying spot scanners for respectively scanning such images, a raster generator for developing the deflection signals for each scanner to provide the scanning rasters thereof, a correlator for comparing the video output signals of said flying spot scanners to provide therefrom a parallax signal representative of relative displacements between such homologous image areas, a frequency selection module for selecting from such parallax signal a component thereof constituting a multiple of the scanning frequency of said scanners to obtain a correction signal and further including a filter having a comb-type band-pass characteristic having a plurality of band-pass peaks which coincide with whole number multiples of the line scanning frequency, and means for combining such correction signal with a deflection signal from said raster generator to one of said flying spot scanners to effect a corrective transformation in the scanning raster thereof.